US009141136B2

(12) United States Patent
Shulenberger

(10) Patent No.: US 9,141,136 B2
(45) Date of Patent: Sep. 22, 2015

(54) TABLET COMPUTER CARRYING CASE WITH RETRACTABLE LATCH

(75) Inventor: Arthur M. Shulenberger, Millbrae, CA (US)

(73) Assignee: Parle Innovation, Inc., Burlingame, CA (US)

( * ) Notice: Subject to any disclaimer, the term of this patent is extended or adjusted under 35 U.S.C. 154(b) by 325 days.

(21) Appl. No.: 13/525,287

(22) Filed: Jun. 16, 2012

(65) Prior Publication Data

US 2013/0178155 A1    Jul. 11, 2013

Related U.S. Application Data

(60) Provisional application No. 61/584,287, filed on Jan. 8, 2012, provisional application No. 61/641,177, filed on May 1, 2012.

(51) Int. Cl.
G06F 1/16    (2006.01)

(52) U.S. Cl.
CPC .............. *G06F 1/162* (2013.01); *G06F 1/1628* (2013.01); *G06F 1/1662* (2013.01)

(58) Field of Classification Search
CPC ...... G06F 1/1662; G06F 1/162; G06F 1/1628
USPC ........ 361/679.29, 679.57, 679.58; 312/223.1, 312/223.2
See application file for complete search history.

(56) References Cited

U.S. PATENT DOCUMENTS

| 6,157,958 | A | 12/2000 | Armitage et al. |
| 6,517,129 | B1 * | 2/2003 | Chien et al. ................ 292/251.5 |
| 6,814,377 | B2 * | 11/2004 | Silverman et al. .............. 292/83 |
| 6,856,506 | B2 | 2/2005 | Doherty et al. |
| 6,980,425 | B2 * | 12/2005 | Chuang et al. ........... 361/679.06 |
| 6,985,356 | B2 * | 1/2006 | Wang ........................ 361/679.06 |
| 7,050,295 | B2 * | 5/2006 | Kang ........................ 361/679.58 |
| 7,079,383 | B2 * | 7/2006 | Homer ..................... 361/679.35 |
| 7,092,246 | B2 | 8/2006 | Tanaka et al. |
| 7,156,351 | B2 * | 1/2007 | Wang et al. .................... 248/121 |
| 7,382,611 | B2 * | 6/2008 | Tracy et al. .............. 361/679.41 |
| 7,405,927 | B2 * | 7/2008 | Lev ......................... 361/679.55 |
| 7,492,579 | B2 * | 2/2009 | Homer et al. ............ 361/679.41 |
| 7,506,152 | B2 * | 3/2009 | Park et al. ..................... 713/100 |
| 7,688,580 | B2 * | 3/2010 | Richardson et al. ..... 361/679.56 |
| 7,787,245 | B2 * | 8/2010 | Prabhune et al. ........ 361/679.37 |
| 8,009,424 | B2 * | 8/2011 | Zhu et al. ................. 361/679.58 |
| D647,526 | S | 10/2011 | Vandiver et al. |
| D659,139 | S | 5/2012 | Gengler |
| 8,355,250 | B2 * | 1/2013 | Yu ............................ 361/679.58 |
| D675,625 | S * | 2/2013 | Hasbrook et al. ............ D14/440 |
| 8,369,074 | B2 * | 2/2013 | Chou et al. ............... 361/679.09 |
| 8,467,178 | B2 * | 6/2013 | Probst et al. ............. 361/679.27 |
| 8,467,179 | B2 * | 6/2013 | Probst et al. ............. 361/679.27 |
| 8,467,183 | B2 * | 6/2013 | Probst et al. ............. 361/679.55 |
| 8,472,168 | B2 * | 6/2013 | Su ............................ 361/679.01 |

(Continued)

*Primary Examiner* — David M Sinclair
*Assistant Examiner* — Robert Brown

(57) ABSTRACT

A carrying case includes a frame member to retain a tablet computer and a base member coupled to the frame member. The frame member includes a recess with a protruding lip to receive a first edge of the tablet computer as it is inserted into the carrying case, and a retractable latching mechanism to secure a second, opposite edge of the tablet computer. The retractable latching mechanism can be moved to a retracted position to enable the second edge of the tablet computer to be inserted within the frame member and then released to a non-retracted position to secure the second edge of the tablet computer within the frame member.

20 Claims, 30 Drawing Sheets

(56) References Cited

U.S. PATENT DOCUMENTS

| | | | |
|---|---|---|---|
| 8,472,177 B2* | 6/2013 | Probst et al. | 361/679.27 |
| 8,472,186 B2* | 6/2013 | Probst et al. | 361/679.55 |
| 8,573,394 B2* | 11/2013 | Ahee et al. | 206/320 |
| 8,587,396 B2* | 11/2013 | Liang et al. | 335/205 |
| 8,611,085 B2* | 12/2013 | Guo | 361/679.58 |
| 8,699,223 B2* | 4/2014 | Yu | 361/679.58 |
| 8,717,319 B2* | 5/2014 | Wu | 345/173 |
| 2003/0112590 A1* | 6/2003 | Shimano et al. | 361/683 |
| 2003/0154414 A1* | 8/2003 | von Mueller et al. | 713/300 |
| 2003/0198008 A1* | 10/2003 | Leapman et al. | 361/681 |
| 2005/0057893 A1* | 3/2005 | Homer et al. | 361/683 |
| 2005/0057894 A1 | 3/2005 | Kim et al. | |
| 2005/0099765 A1* | 5/2005 | Wang | 361/681 |
| 2005/0128690 A1* | 6/2005 | Chuang et al. | 361/681 |
| 2005/0168925 A1* | 8/2005 | Fang et al. | 361/683 |
| 2005/0185367 A1* | 8/2005 | Chuang et al. | 361/681 |
| 2005/0207102 A1* | 9/2005 | Russo | 361/683 |
| 2005/0280984 A1* | 12/2005 | Huang et al. | 361/686 |
| 2006/0002062 A1* | 1/2006 | Kwon et al. | 361/680 |
| 2006/0221565 A1 | 10/2006 | Doherty et al. | |
| 2006/0256511 A1 | 11/2006 | Ma | |
| 2007/0152633 A1* | 7/2007 | Lee | 320/114 |
| 2007/0186380 A1* | 8/2007 | Kim et al. | 16/239 |
| 2007/0297149 A1* | 12/2007 | Richardson et al. | 361/731 |
| 2009/0083562 A1 | 3/2009 | Park et al. | |
| 2009/0186264 A1* | 7/2009 | Huang | 429/96 |
| 2010/0039764 A1 | 2/2010 | Locker et al. | |
| 2010/0066665 A1 | 3/2010 | Yoneda et al. | |
| 2010/0172081 A1* | 7/2010 | Tian et al. | 361/679.29 |
| 2010/0294909 A1* | 11/2010 | Hauser et al. | 248/456 |
| 2010/0321906 A1* | 12/2010 | Nakano | 361/752 |
| 2011/0074709 A1* | 3/2011 | Cheng et al. | 345/173 |
| 2011/0115735 A1* | 5/2011 | Lev et al. | 345/173 |
| 2011/0128222 A1* | 6/2011 | Hirota et al. | 345/158 |
| 2011/0147398 A1* | 6/2011 | Ahee et al. | 220/810 |
| 2011/0170252 A1 | 7/2011 | Jones et al. | |
| 2011/0176266 A1* | 7/2011 | Morooka et al. | 361/679.07 |
| 2011/0199310 A1* | 8/2011 | Oakley | 345/168 |
| 2011/0199727 A1* | 8/2011 | Probst | 361/679.09 |
| 2011/0222238 A1* | 9/2011 | Staats et al. | 361/679.55 |
| 2011/0267757 A1* | 11/2011 | Probst et al. | 361/679.09 |
| 2011/0284420 A1* | 11/2011 | Sajid | 206/576 |
| 2012/0113579 A1 | 5/2012 | Agata et al. | |
| 2012/0194448 A1* | 8/2012 | Rothkopf | 345/173 |
| 2012/0218699 A1* | 8/2012 | Leung et al. | 361/679.08 |
| 2012/0224316 A1* | 9/2012 | Shulenberger | 361/679.09 |
| 2013/0141854 A1* | 6/2013 | Behar et al. | 361/679.09 |
| 2013/0201625 A1* | 8/2013 | Liang et al. | 361/679.55 |

\* cited by examiner

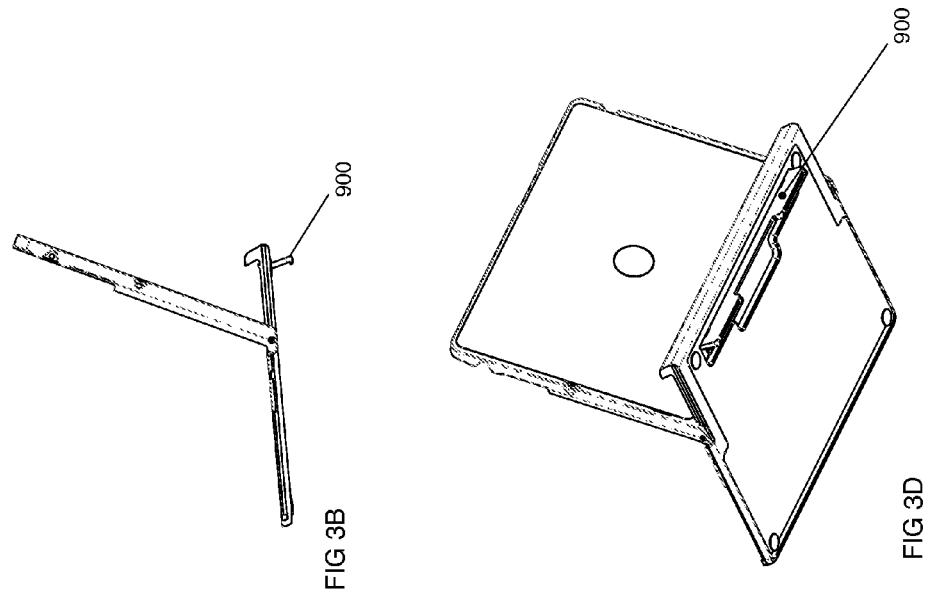
FIG 3B
FIG 3D
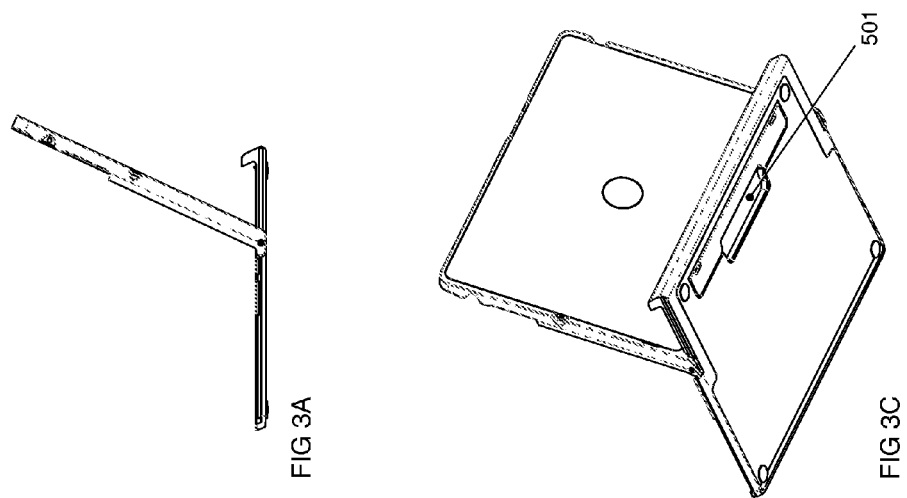
FIG 3A
FIG 3C

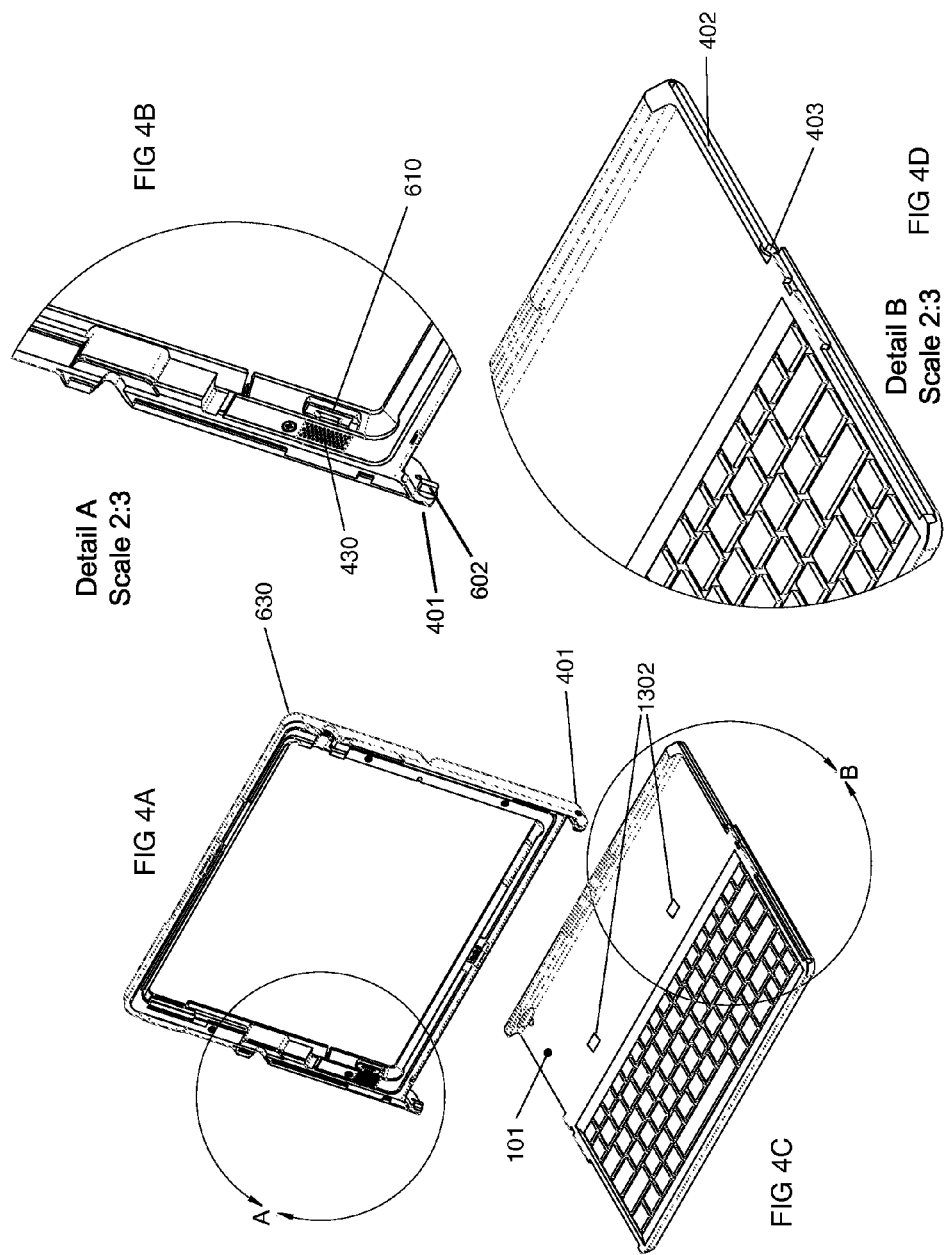

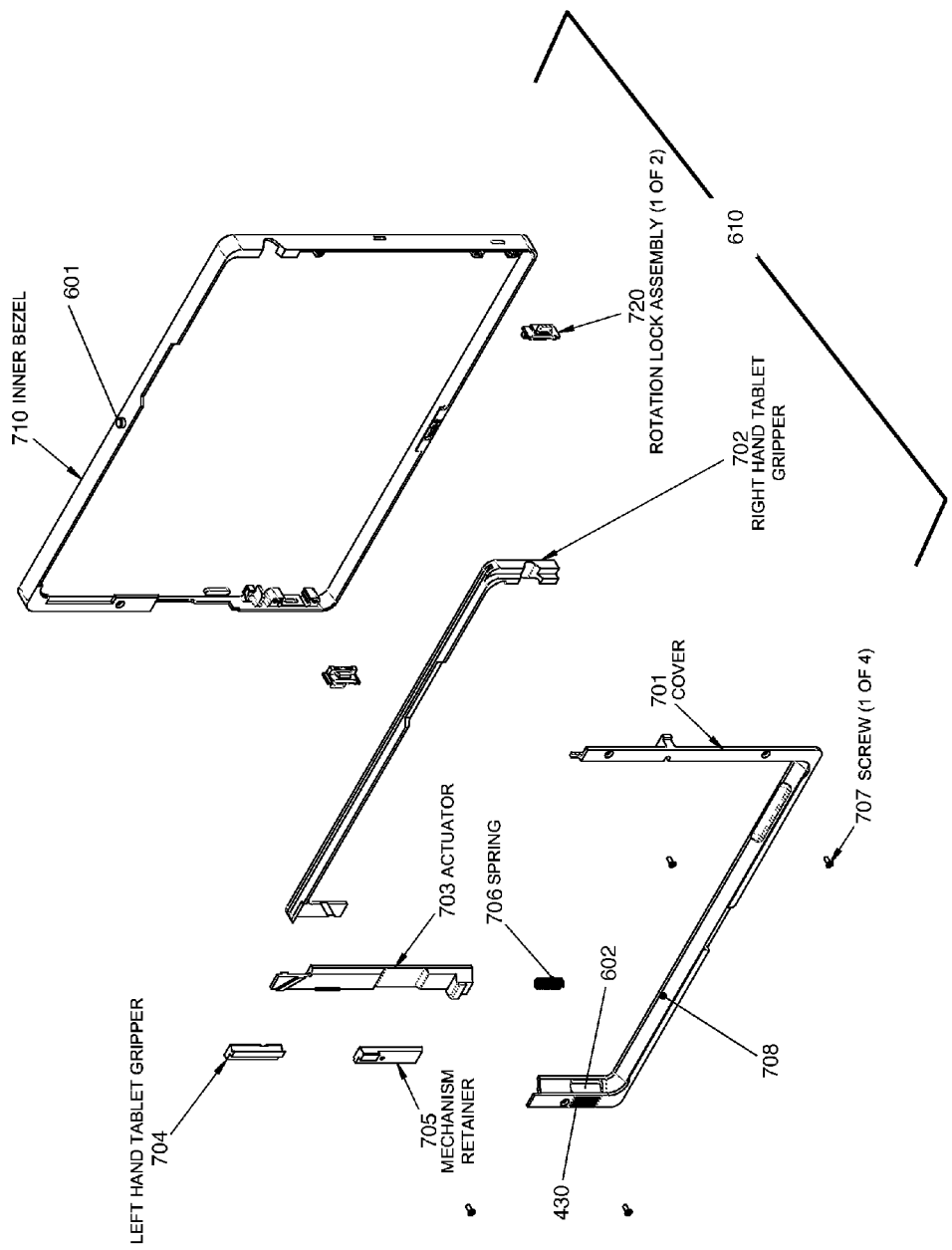

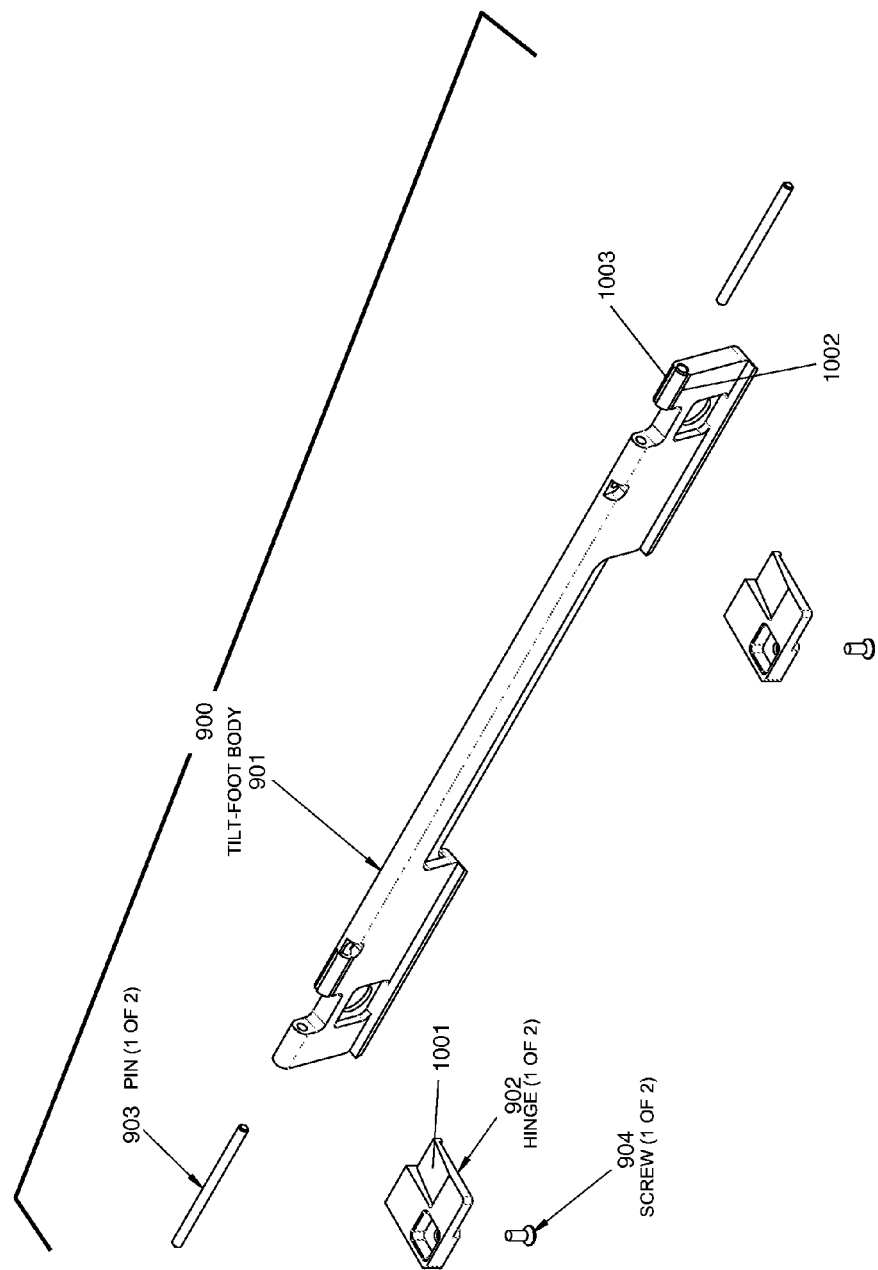

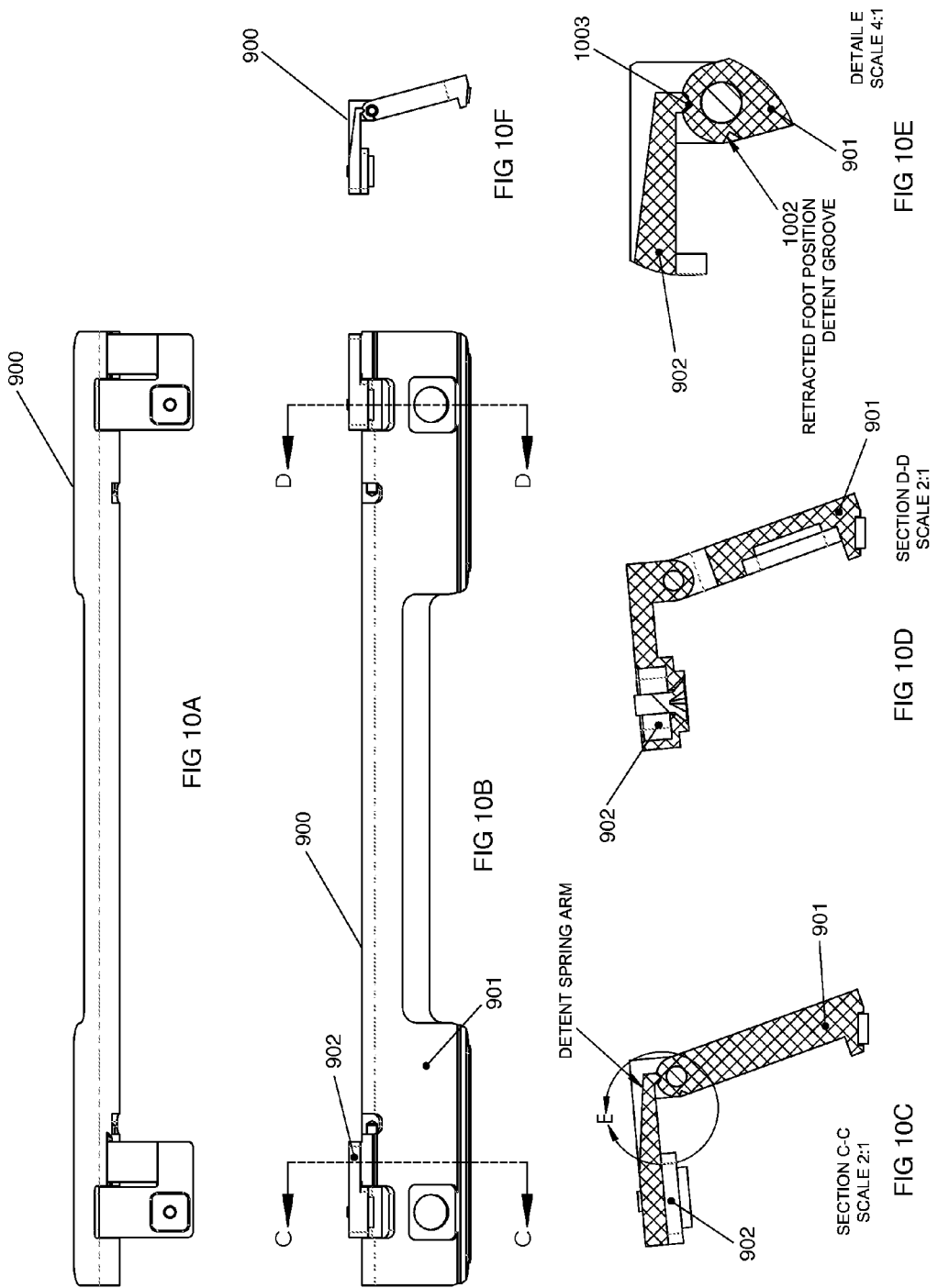

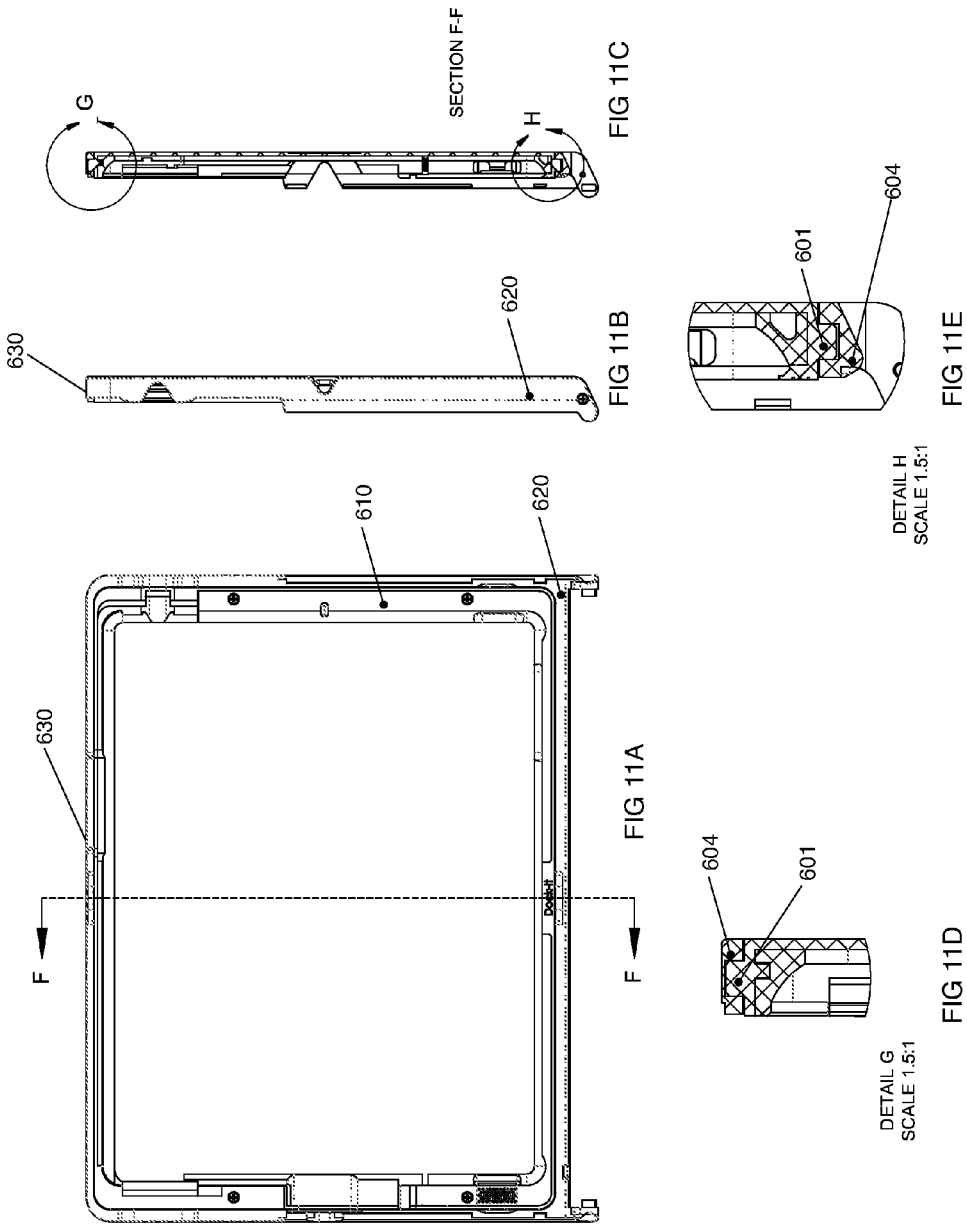

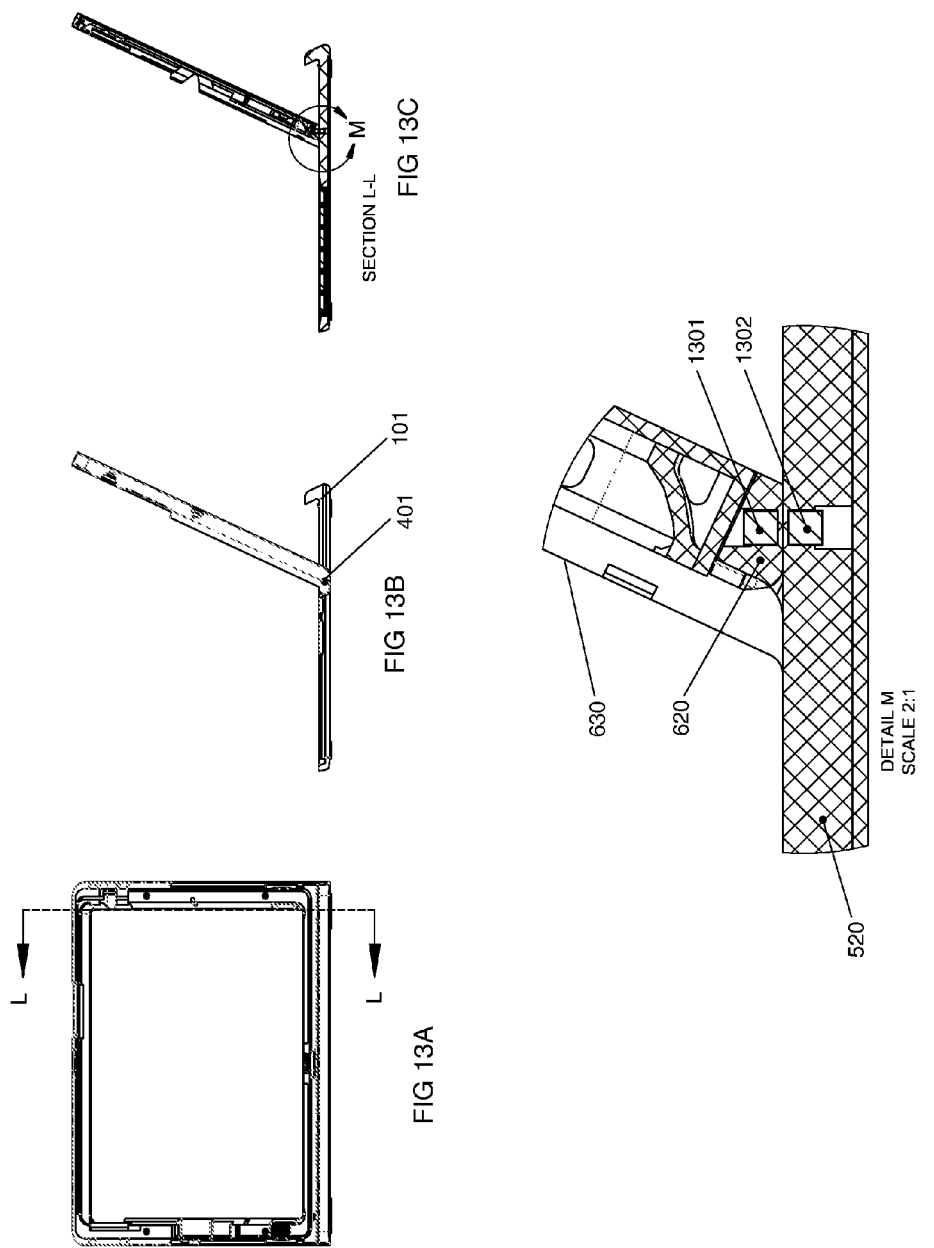

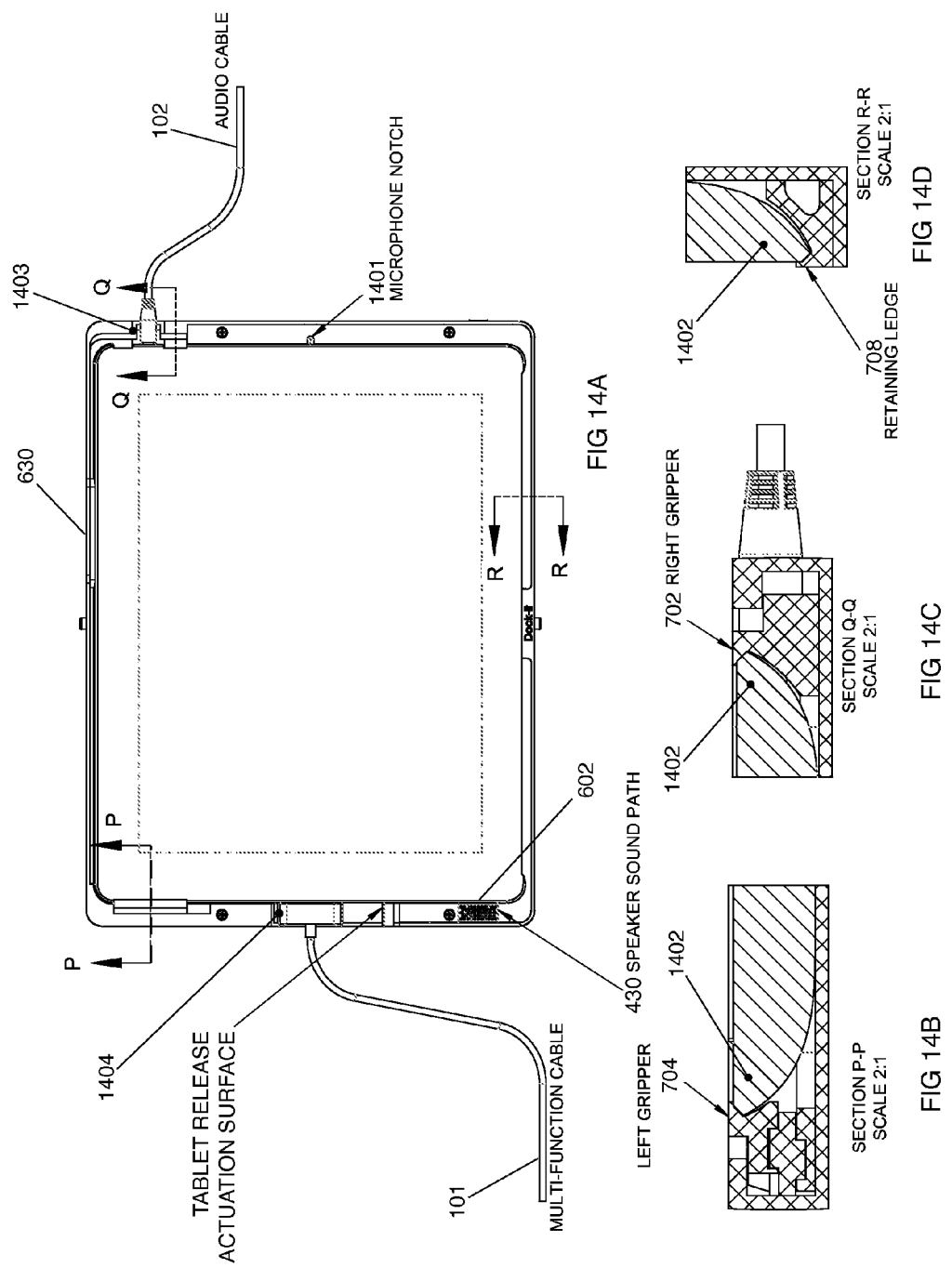

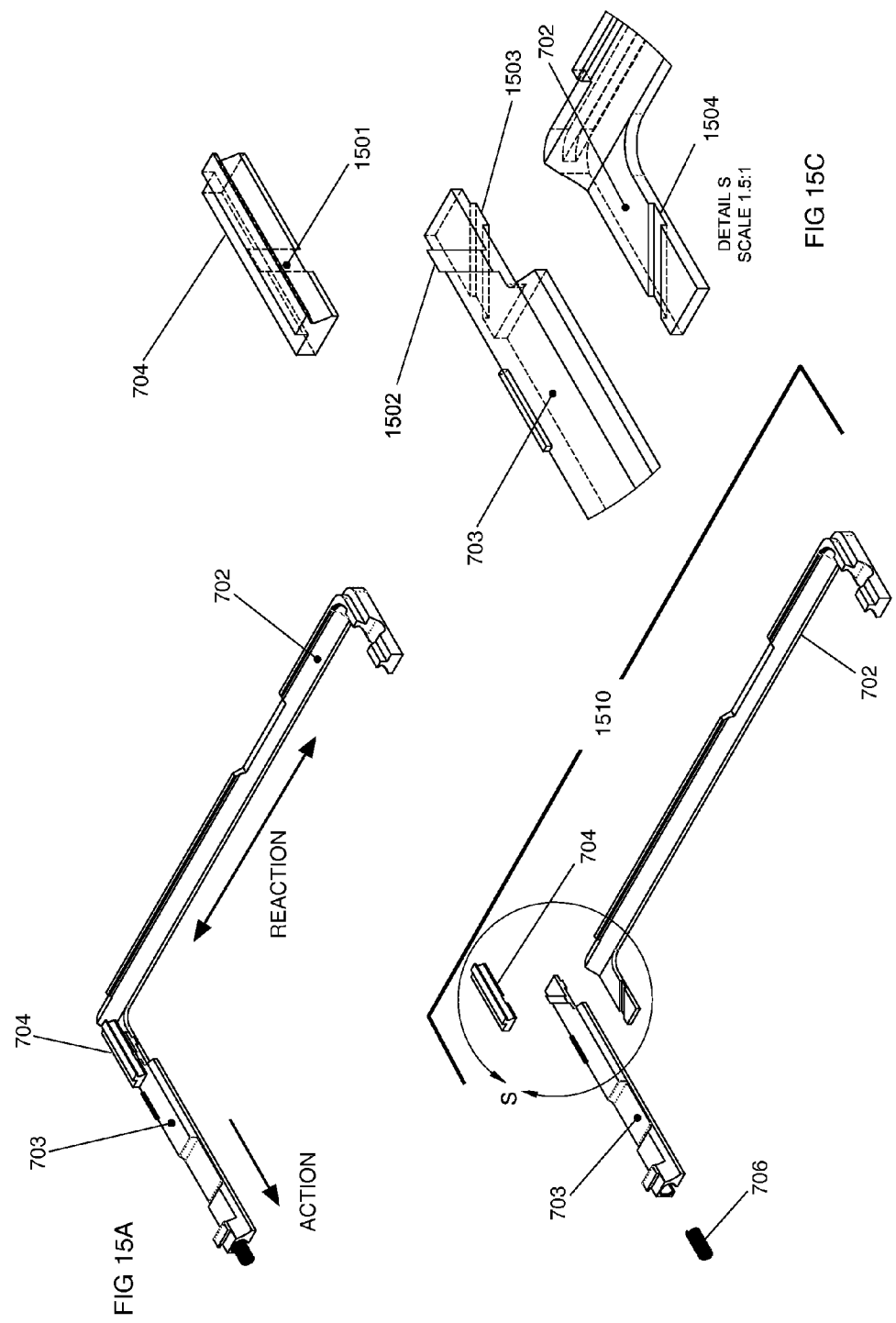

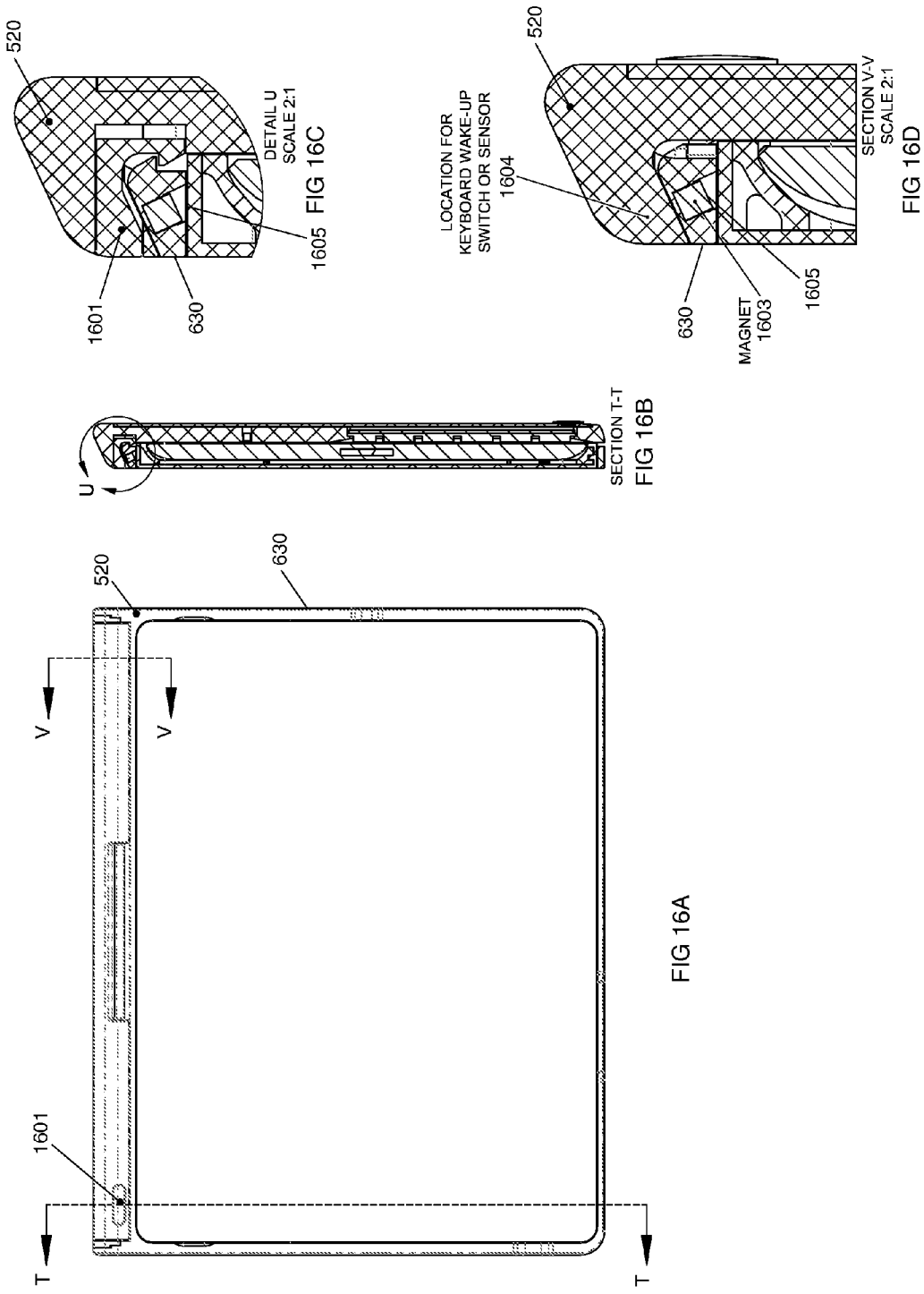

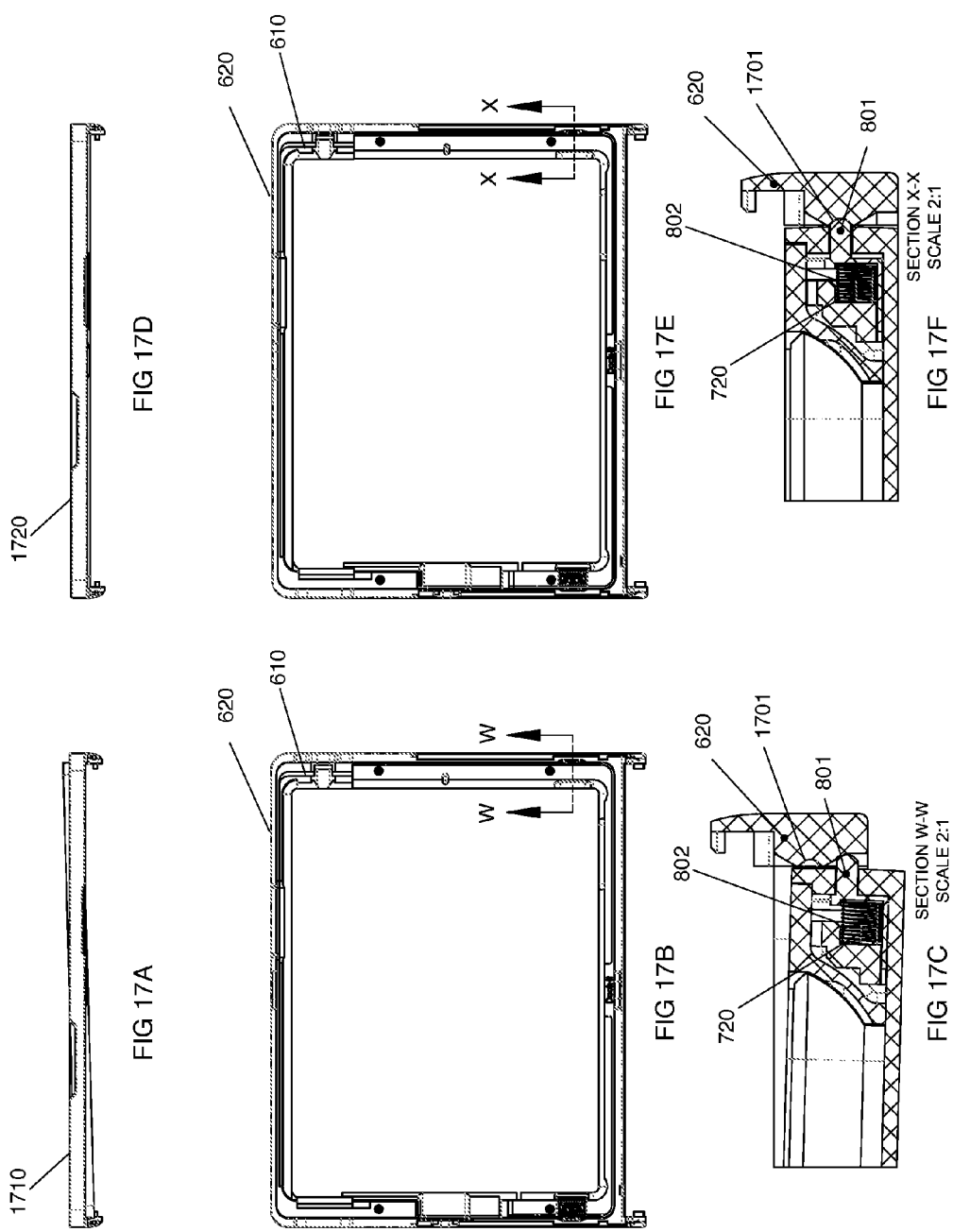

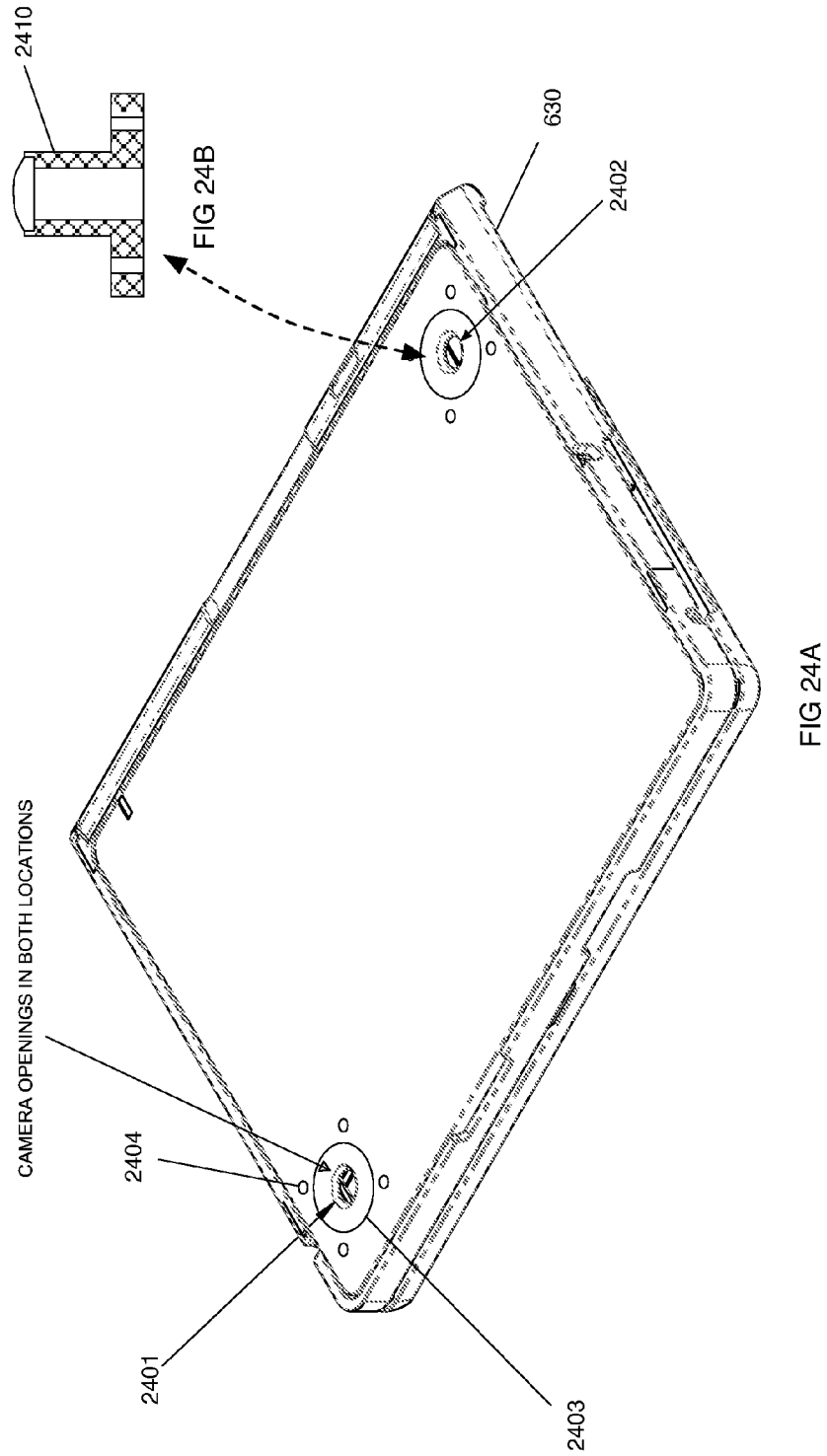

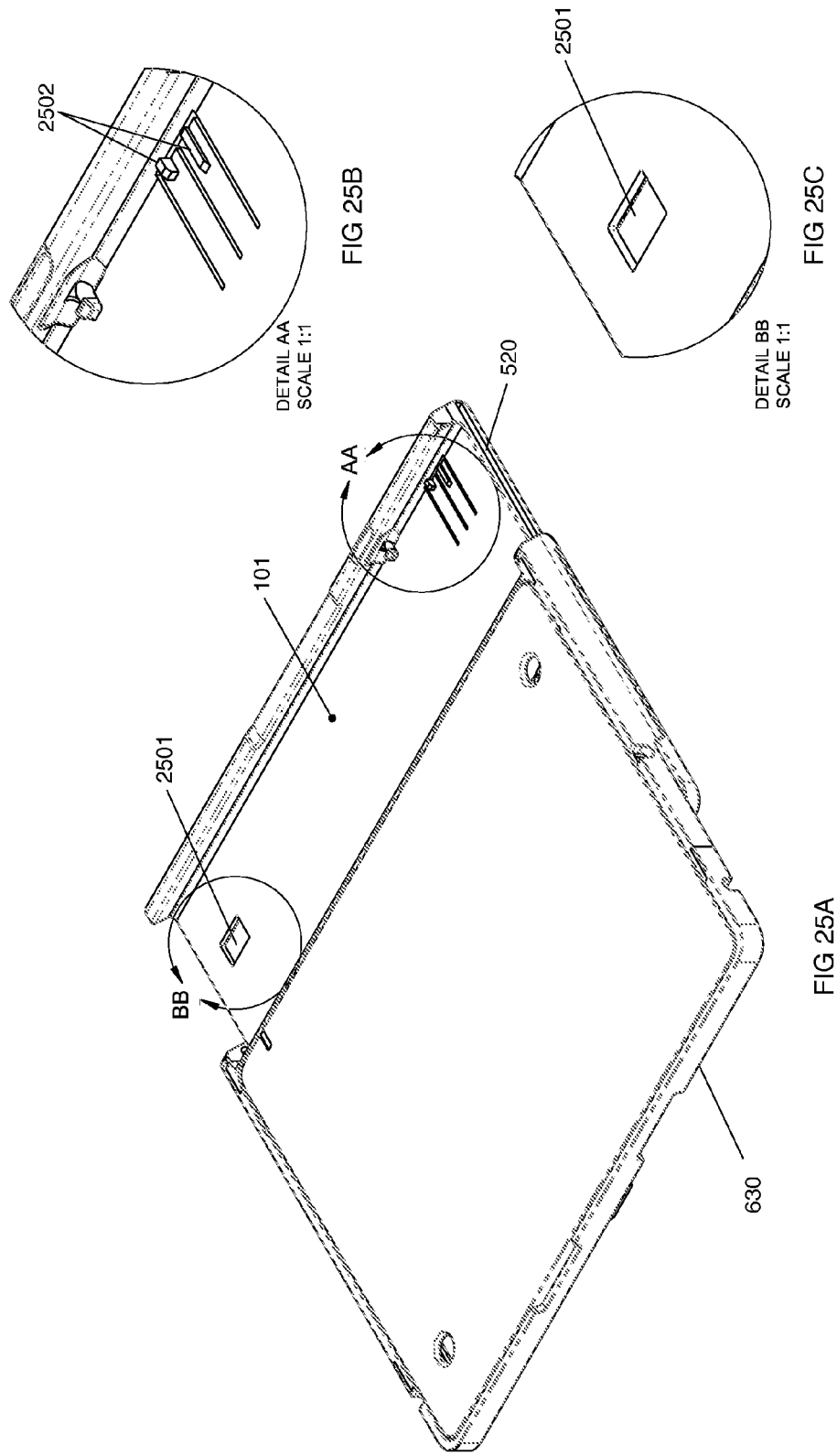

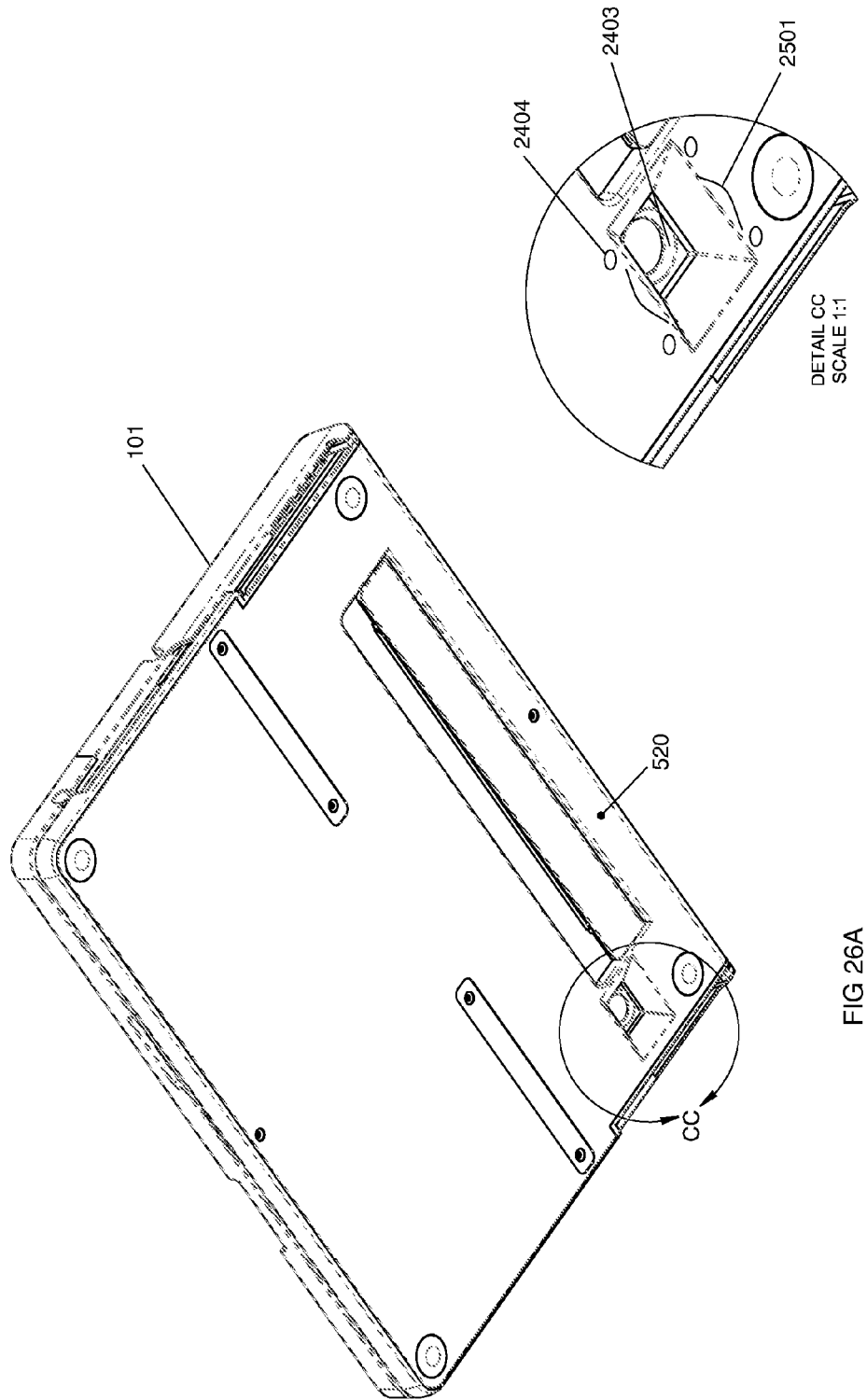

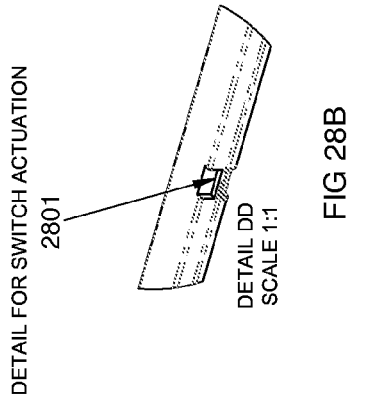
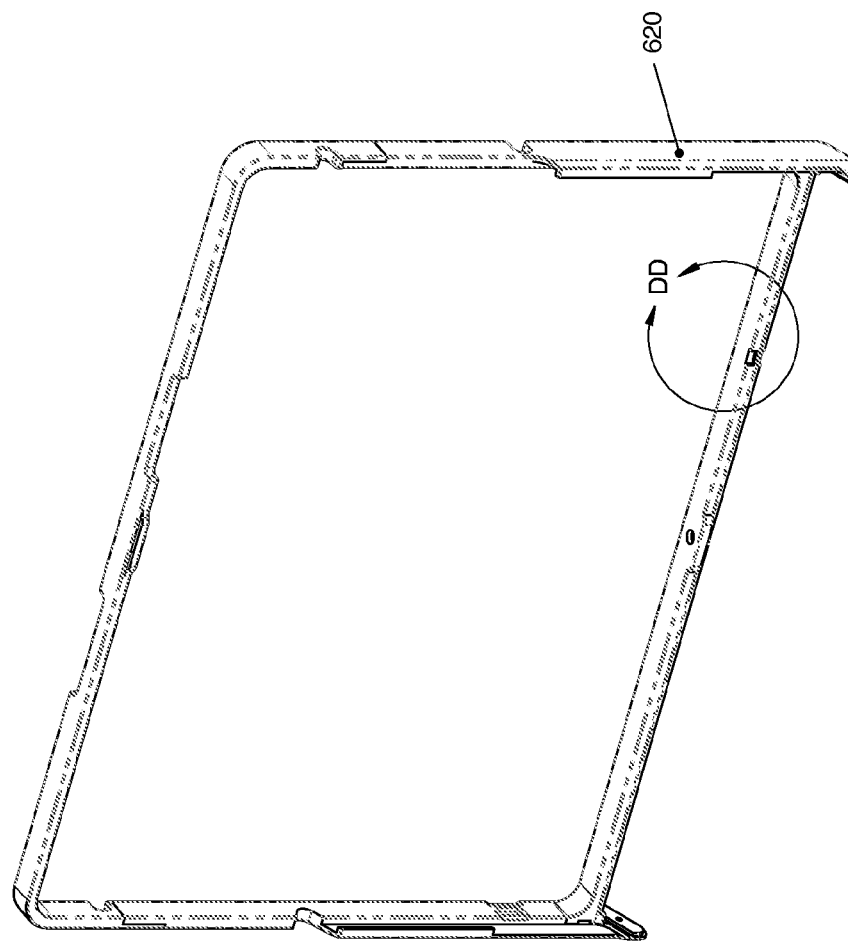

TABLET COMPUTER CARRYING CASE WITH RETRACTABLE LATCH

CROSS REFERENCE TO RELATED APPLICATIONS

This application claims priority to and hereby incorporates by reference the following U.S. Provisional Patent Applications:

| Application No. | Filing Date | Title |
| --- | --- | --- |
| 61/584,287 | Jan. 8, 2012 | A Multifunctional Carrying Case for a Tablet Computer |
| 61/641,177 | May 1, 2012 | A Multifunctional Carrying Case for a Tablet Computer |

TECHNICAL FIELD

The present disclosure relates to tablet computers, carrying cases for tablet computers, keyboards and other accessories for tablet computers, and the like.

BACKGROUND

A tablet computer is a self-contained computing device which is generally portable and hand-held, and is dominated in its design by its display and associated touch-screen interface. Tablet computers generally lack physical keyboards and when the user wishes to input text, the user activates a software-generated touch-screen keyboard for that activity. This is adequate for small amounts of text but awkward when large amounts of text need to be input.

Since it is not uncommon for tablet computer users to have the intermittent need to input large amounts of text, physical keyboards that are compatible with tablet computers are manufactured and sold. The use of such prior art keyboards with tablet computers is problematic in a number of ways, such as difficulty in carrying the keyboard and tablet computer together conveniently, setting up the combination of keyboard and tablet computer quickly and securely, and providing protection to the tablet computer, particularly its front surface touch screen display, when it is carried together with a keyboard.

BRIEF DESCRIPTION OF THE DRAWING

The various embodiments disclosed herein are illustrated by way of example, and not by way of limitation, in the figures of the accompanying drawings and in which like reference numerals refer to similar elements and in which:

FIG. 3a-3d are plan and isometric views showing the extension of the keyboard foot mechanism in the keyboard operating mode.

FIGS. 4a-4d are isometric views and exploded isometric views showing details of the slide structure and sound exit port in the frame structure.

FIG. 7 is an exploded isometric view of the inner bezel and the tablet computer gripper mechanism that fits within the inner bezel. The cover mechanism is shown which captures and secures the gripper mechanism into the inner bezel. The rotation lock assembly mechanism is shown which secures the tablet computer either in a pivotal position for keyboard use or rotated 180 degrees for tablet use. The gripper actuator is shown, along with its retainer, which opens the tablet gripper to allow the user to insert the tablet computer and securely holds it closed with a spring, also shown.

FIG. 9 is an isometric exploded view of the tilt foot assembly of an embodiment showing the tilt foot body and the hinge.

FIGS. 10a-10f are a collection of plan view drawings showing the hinge and detent mechanism of the tilt foot assembly of an embodiment.

FIGS. 11a-11e are a composite of plan views and cutaway views with details of the swivel mechanism showing rotation of the inner bezel within the outer bezel of an embodiment. Section F-F is taken exactly in the center, through the swivel mechanism. The tablet computer is not shown in this drawing so that details G (FIG. 11d) and H (FIG. 11e) can be seen.

FIGS. 13a-13d are a collection of plan views showing an embodiment open in the keyboard operating mode. Detail M in FIG. 13d shows the location of magnets used to hold the case in the open position.

FIGS. 14a-14d are a collection of plan view drawings and section details showing the gripper and cable access features of the tablet computer housing. FIG. 14a shows the features provided in the inner bezel assembly to accommodate the multifunction cable and audio cable elements of the tablet computer. Also shown is the speaker sound outlet and notch for microphone sound input from and to the tablet computer.

FIGS. 14b and 14c show details of the movable gripper cavity that captures the tablet computer. FIG. 14d shows details of the stationary lower retaining edge shape for capturing the tablet computer.

FIGS. 15a-15c, are a collection of isometric and detail isometric views of the gripper and gripper actuator assembly. This mechanism translates the vertical motion of the actuator to a horizontal separation motion of the right and left gripper pads. Also shown is the spring which maintains inward force on the gripper pads to secure the tablet computer.

FIGS. 16a-16d are a collection of plan views showing the keyboard slide latch and magnet for the keyboard wake up sensor.

FIGS. 17a-17f are a series of plan view drawings and section details of the rotation detent mechanism. FIGS. 17a-17c show the mechanism very close and ready to engage. FIGS. 17d-17f show the mechanism engaged.

FIG. 24a is an isometric view of an embodiment of the case shown in the closed position and marking the camera openings and camera features in the cover plate behind the tablet computer assembly. FIG. 24b is an isometric view of an optional camera lens designed to interface to the features around the camera openings.

FIGS. 25a-25c are a collection of isometric views and detail views of the camera opening in the base and details of features in the base which interface with position sensing switches.

FIGS. 26a-26b are oblique views of the base from below showing the camera opening.

FIGS. 28a-28b are oblique views of the bezel mounting frame and a detail of a relief in the frame that interacts with a position sensing switch.

DETAILED DESCRIPTION

In various embodiments disclosed herein, a carrying case for securing a tablet computer can be transformed between modes of operation including; storage mode, tablet computer mode and keyboard mode, all without removal of the tablet computer or detachment of any components of the carrying case, providing a strong and secure structure for use in less than ideal environments such as those of confined space or in a moving vehicle.

In one embodiment, the carrying case serves to secure a tablet computer and also provides a physical keyboard to the tablet computer user. When in an open configuration, the carrying case supports the tablet computer in an ergonomic position relative to the keyboard. When in the closed configuration the carrying case provides a convenient structure for carrying the tablet computer and also protects the tablet computer.

Carrying case embodiments disclosed herein provide the following:
  a. ability to transition (or be reconfigured) from storage to any one of multiple operating modes including, but not limited to, keyboard and tablet mode without having to disconnect or remove any components,
  b. stability in the keyboard mode by securing the tablet computer portion to a base keyboard portion via a sliding connection that places the weight of the display near the center of the base,
  c. ability to pivot the tablet computer portion relative to the keyboard portion, still maintaining the sliding connection to the base, so as to make the transition from keyboard to tablet mode, without having to disconnect the two portions,
  d. a rigid, secure, strong and light structure that can be easily managed on an uneven surface or in a moving vehicle without loss of control.

Alternative embodiments of the invention are intended to offer features such as expansion options, solar power options and universal interface options, with and without, a physical electrical connection to the tablet computer.

Figure 1A:
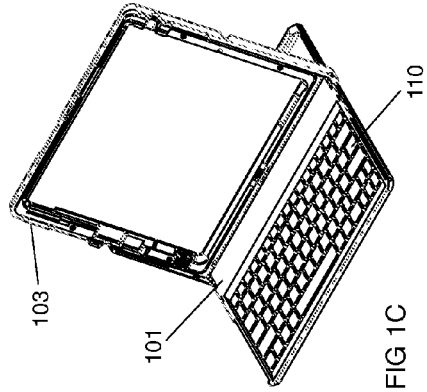
FIGS. 1a-1f are isometric views of an embodiment of a carrying case loaded with a tablet computer and a keyboard. The embodiment is shown closed 1a, open in keyboard mode with the tablet computer in landscape orientation, 1c, and open in tablet mode with the tablet computer rotated into the display surface up position, 1f. The intermediate views 1b, 1d, 1e, complete a sequence showing seamless transformation from closed to open in tablet mode while transforming through the open in keyboard mode.
Figure 1B:
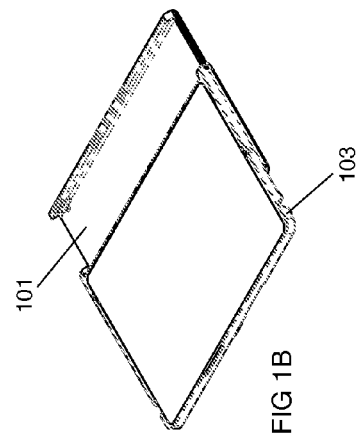
Figure 1C:
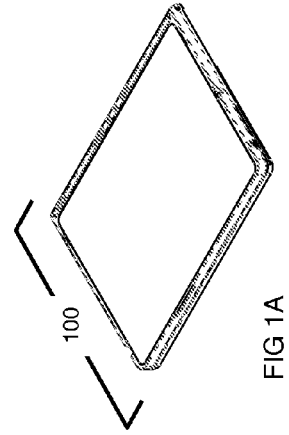
Figure 1D:
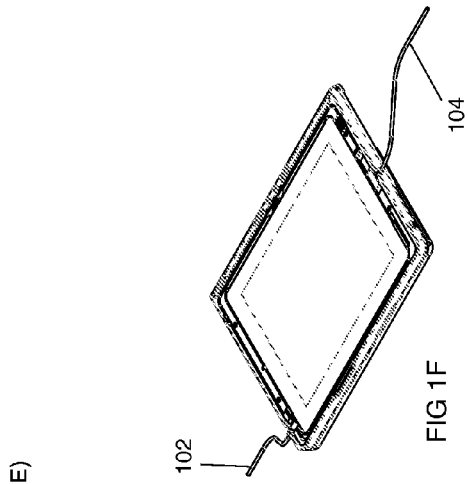
Figure 1E:
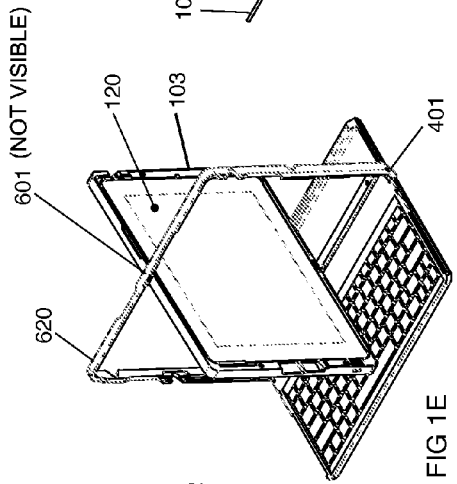

FIGS. 1a-1f illustrate an embodiment of a multifunctional carrying case 100 for a tablet computer in several modes of operation. In particular, FIGS. 1a-1f, that show the basic design and functionality of the carrying case, including a frame member 103 (or "frame") that is rotatably and slidably coupled to a base member 101 (or "base"), with a tablet computer 120 inserted within and retained by frame member 103, and a keyboard 110 installed within a keyboard housing of base member. Examples of the various operating configurations depicted include, for example and without limitation:
  FIG. 1a: fully closed with base member 101 and frame member disposed parallel to one another and the frame member translated (slid) to a position such that the face of the tablet computer overlays and is facing base member 103 (i.e., such that both the tablet computer's touch screen display surface and the keyboard surface are fully covered and protected);
  FIG. 1b: frame member 103 (having the tablet computer retained therein) slid forward relative to base member 101 (i.e., to an offset relative to base member 101 in contrast to frame-to-base edge alignment in the fully closed configuration) in preparation for transition to keyboard operating mode;

FIG. 1c: case open (frame member 103 rotated relative to base member 101 after having been slid forward) and fully deployed with tablet computer 120 and keyboard 110 positioned for keyboard operating mode;

FIG. 1d: operating in keyboard mode with the additional connection of a system cable 104, to the main port of the tablet computer, and an audio cable, 102, connected to the audio output port of the tablet computer;

FIG. 1e: showing inner and outer bezel components of frame member 103, where inner bezel 610 of the frame member (which is retaining tablet computer 120) is rotatably coupled to outer bezel 620 and disposed halfway through a rotation. Outer bezel 620 is securely attached to the inner bezel through pivot pins, 601, (not visible in FIG. 1e) and to base member 101, by a slide hinge 401, to enable frame member 103 to be translated (slid) and rotated relative to base member 101 and thus enable carrying case 100 to be transitioned between different operating modes or configurations; and FIG. 1f: inner bezel 610 fully rotated and the carrying case secured in the tablet operating mode with the display surface exposed and the keyboard surface hidden and protected.

Figure 2:
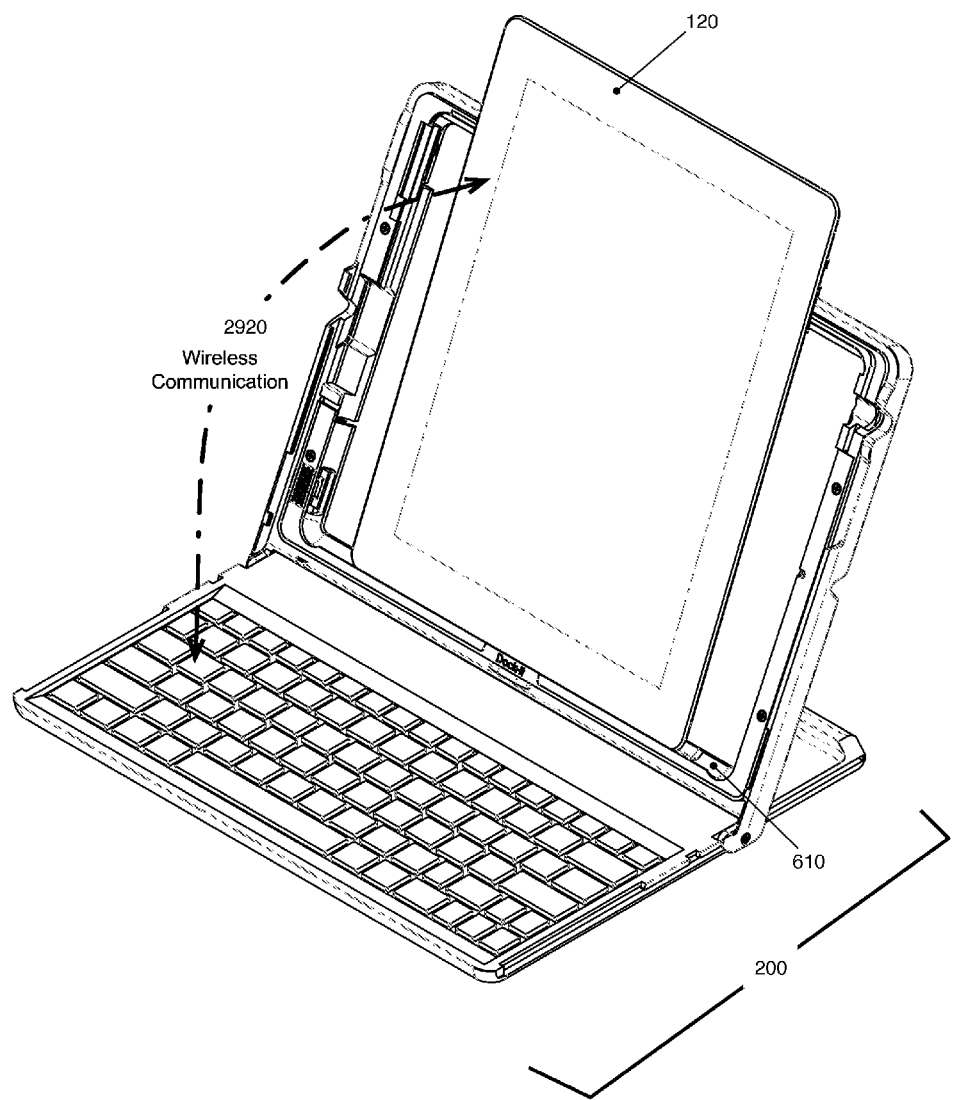
FIG. 2 is an isometric view of an embodiment in an alternate keyboard mode with the tablet computer rotated so that the screen is in the portrait orientation. In this mode the inner lip of the bezel supports the tablet computer as shown in this drawing.

FIG. 2 shows an alternate operating mode where the case 200 is physically separated from the tablet computer 120 which is resting on the bottom edge of the inner bezel 610 and is positioned in a portrait mode.

FIGS. 1a-1f illustrate a multi-modal feature of the carrying case, and more specifically the ability of the carrying case to operate in several modes and transition between the modes without detachment of any portion. In contrast to conventional approaches that require component detachment and thus are plagued by physical management problems when operated in adverse environments, the ability to transition between operating modes while maintaining physical interconnection of carrying case components eliminates such problems, making it easy to operate the tablet computer and features of the carrying case in a cramped space, or one with uneven table top surface and or in a moving vehicle.

FIG. 2 illustrates an example of an optional operating mode that allows the tablet computer to be physically detached from the carrying case but still used with the keyboard because of a wireless interface, 2920, between the keyboard and the tablet computer. In FIG. 2 the tablet computer is oriented in a portrait mode, rotated 90 degrees from the landscape mode demonstrated in FIG. 1.

FIGS. 3a-3d, illustrate an exemplary operation and use of the keyboard foot 900 to tilt the system upward in the rear when used in the keyboard mode. In FIGS. 3a and 3c the case is open in the keyboard mode with the foot concealed in recess 501. In this position no element of the keyboard foot 900 protrudes beyond the surface of the bottom cover, 502. FIGS. 3b and 3d show the keyboard foot 900 fully deployed and locked down. This will provide a forward tilt to the system to facilitate keyboard use when placed on a smooth flat surface such as a desktop. It is a feature of the embodiment that the keyboard foot 900 remain fully recessed when not in use so that it does not interfere with balancing the system on the user's leg or some other uneven surface when the system is used in a less than ideal setting.

FIGS. 4a-4d illustrate how an embodiment of the invention is able to slide the tablet computer, 120, contained in bezel assembly 630, forward, as illustrated in FIG. 1b, and rotate it upward into the keyboard mode, as illustrated in FIG. 1c, while capturing the bezel assembly, 630, and tablet computer, 120, and keeping them firmly attached to the keyboard and base member 101. Slide hinge, 401, on the outer bezel frame, 620, is the element responsible for this action. It engages slot, 402, and receiver, 403, in the keyboard housing 520. The slot, 402, allows motion forward and backward, the receiver, 403, a special feature in the slot, allows rotation only at the forward limit of the slide motion. This mechanism facilitates transformation of the carrying case between operating modes without detachment of any of its components.

Sound exit port, 430, built into bezel assembly, 630, is shown in FIG. 4a. Shown is the perforated cover of the sound channel itself, 602, which is not shown. Providing an unimpeded pathway for the audio output of the tablet computer is a feature of one embodiment the invention.

Figure 5:
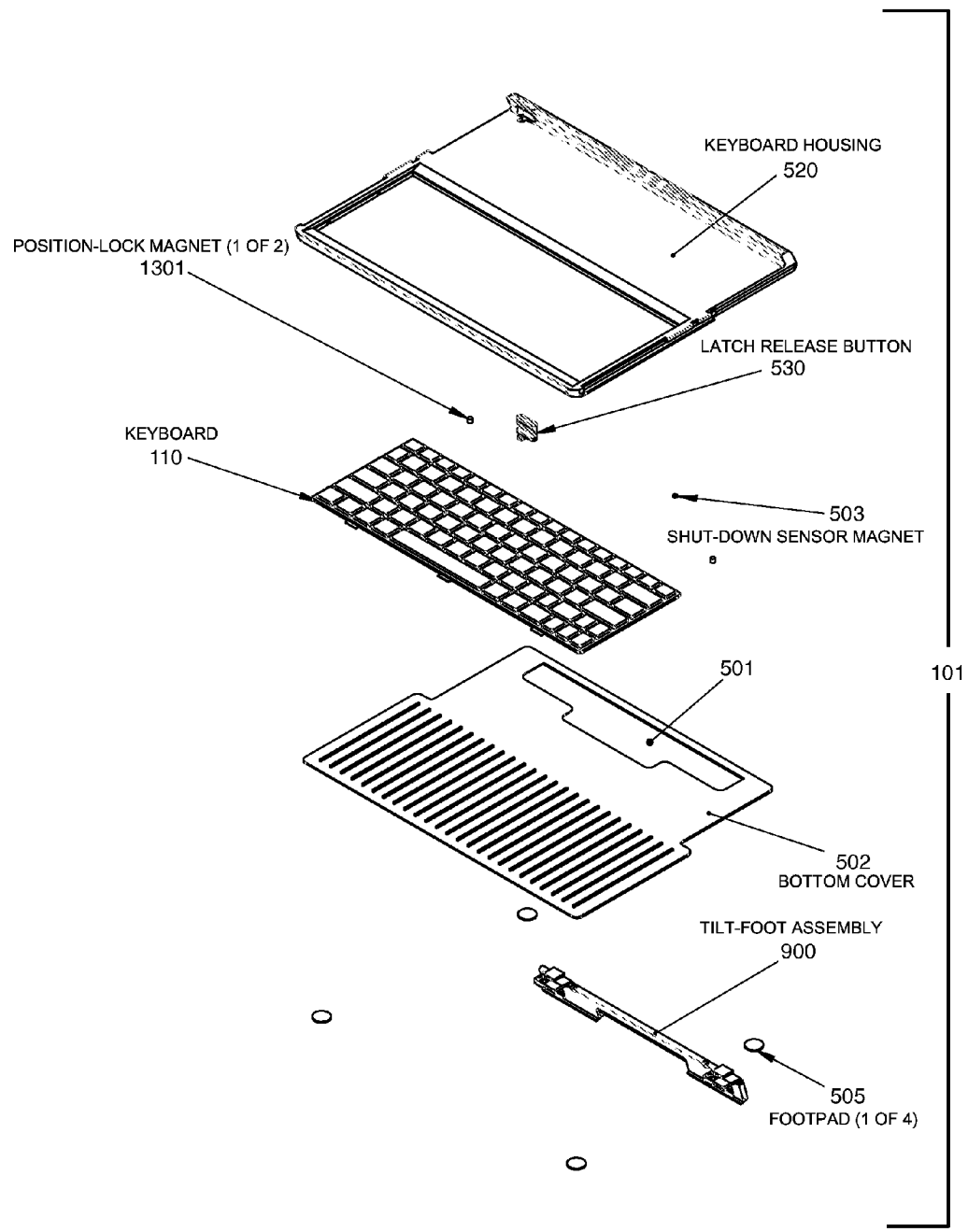
FIG. 5 is an exploded isometric view showing components of the keyboard base including the shutdown magnet used to control the state of the tablet computer when the case is closed and the position lock magnets used for holding the case open in the keyboard mode plus the latch release button mechanism for keeping the case closed during transport. Also shown are the tilt foot and non-skid foot pads located on the underside of the bottom cover.

FIG. 5 is an exemplary exploded view of an embodiment of base member 101 (also referred to herein as a "base assembly") and constituent components, namely:

keyboard housing, 520,
position lock magnet, 1301,
latch release button, 530,
shut down sensor magnet, 503,
keyboard, 110,
bottom cover, 502, which includes
keyboard foot recess, 501,
tilt foot assembly, 900,
and foot pads, 505.

The latch release button, 530, is part of the latching system which keeps the case closed when traveling. This is an important feature of this embodiment since the systems within are protected when the carrying case of this invention is in the closed mode. Keeping it latched in that mode offers a higher level of protection. This exploded view of the assembly is included to fully describe the embodiment.

Figure 6:
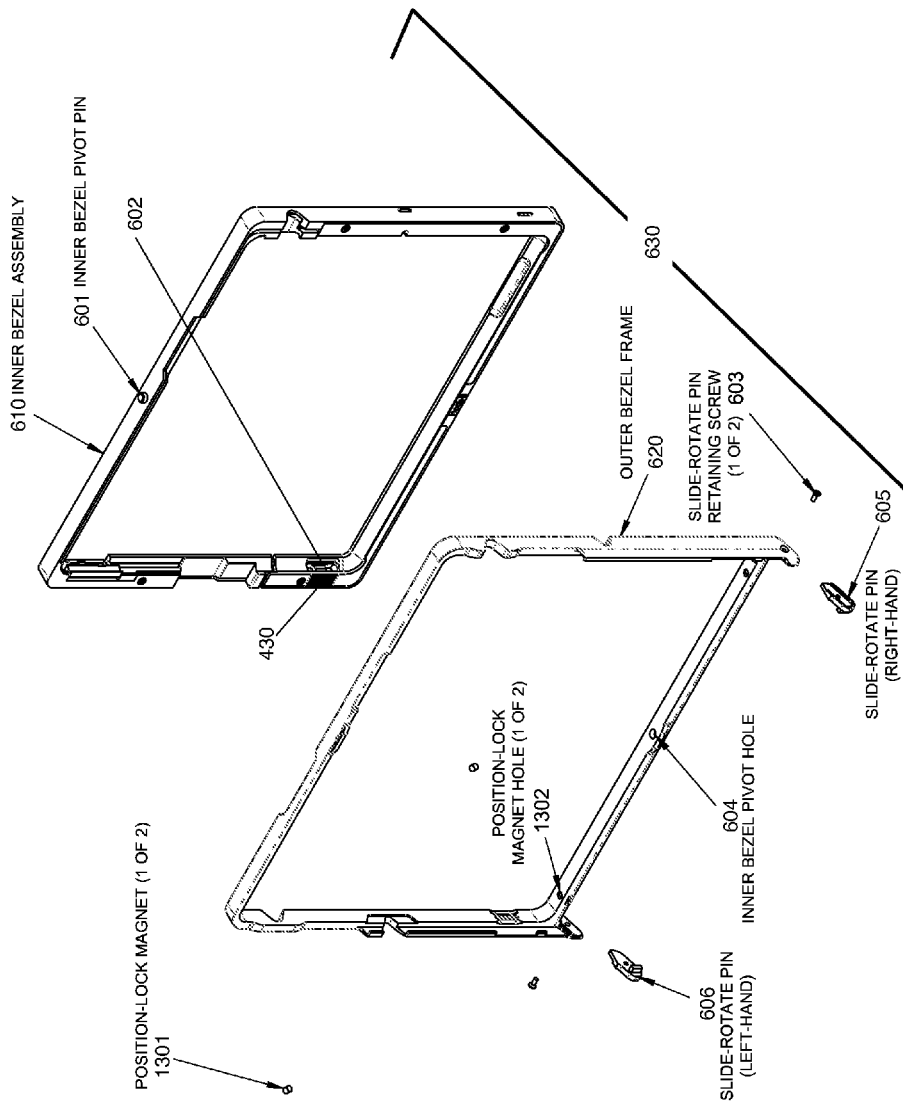
FIG. 6 is an exploded isometric view of the inner and outer bezel, which contain the tablet computer, and the bezel pivot mechanism that allows the tablet computer to rotate while still being captured by the inner bezel assembly. Also shown are position locking magnets (complimentary to those in FIG. 5) for holding the case in the open position. Also shown are the detachable slide-rotation pins, in their removed position, ready for assembly.

FIG. 6 is an exploded detail of the bezel assembly, 630. Assembly 630 is constructed of outer bezel frame 620, and inner bezel assembly 610. The tablet computer, 120, not shown, can be positioned within the inner bezel assembly 610. Two pivot pins, 601, secure the inner bezel assembly to the outer bezel frame by engaging pivot holes 604, in outer frame 620. This pin and hole mounting allows the inner bezel assembly, 610, to rotate within outer bezel 620, while still maintaining secure attachment. This element of the embodiment is partly responsible for the embodiment's ability to transform between modes of operation without detachment of any components.

Left and right slide-rotate pins, 605 and 606, are fastened to outer bezel frame, 620, by retaining screws, 603. By having these components, 605 and 606, attached separately, in this embodiment, rather than built into outer frame 620, assembly is facilitated. To assemble the outer bezel frame it is positioned in operating proximity to base assembly 101, not shown, then pins, 605 and 606, are secured in place engaging the base assembly and the outer bezel frame. This provides a solution to assembly of a tight fitting but movable slide joint in this embodiment shown and discussed in detail with FIG. 4.

In FIG. 6 sound channel 602 is shown built into an embodiment of inner bezel assembly 610. This channel acts to direct the sound, emitted horizontally from the tablet computer, 120, not shown, turning the sound 90 degrees in the sound channel 602 and exiting through port 430, being directed perpendicular out from the surface of the tablet computer screen directly toward the user. This rotation of the sound from horizontal to directly toward the user is a feature of certain embodiments which provides a higher quality of sound reaching the user with less sound being distributed into the area surrounding the tablet computer. It is intended to improve sound quality as perceived by the user and reduce audible disturbance of nearby persons.

In an alternative embodiment, bezel assembly 630 (i.e., a frame member) further includes an ejector to assist the user when removing tablet computer 120 from the bezel assembly, 630. When the user inserts tablet computer 120 into bezel assembly 630, the ejector engages the rear surface of tablet computer 120 prior to full insertion of tablet computer 120 into the recess into which it fits in bezel assembly 630. This ejector or ejector mechanism may be implemented by a flat spring, a coiled spring, a flexible tab, or other force-producing mechanical elements or mechanisms. In the embodiment shown it may be possible to provide reduced or eliminated access reliefs in the bezel assembly 630, including reliefs in outer bezel frame 620 and/or in inner bezel assembly 610. The ejector may remain in tension while tablet computer 120 is retained in the bezel assembly 630 such that, when the user depresses the release actuator 703, the tablet computer 120 "springs forward" slightly to render the upper edge of tablet computer 120 readily accessible to the user to tilt tablet computer 120 further away from bezel assembly 630, and lift it free. Conversely, when the user inserts tablet computer 120 into bezel assembly 630, the user may need to overcome a modest force and press the tablet computer back into its mounting position in bezel assembly 630, thereby also compressing or tensioning the ejector. As tablet computer 120 reaches its full engagement in bezel assembly 630, the right and left hand grippers 702, 704 then capture and retain the tablet computer.

FIG. 7 shows an exemplary exploded view of inner bezel assembly, 610, and the components that go into this embodiment, namely;
  cover 701,
  right hand tablet gripper 702,
  actuator 703
  left hand tablet gripper 704,
  mechanism retainer 705,
  spring for gripper mechanism 706,
  screw(s) 707,
  inner bezel 710,
  and rotation lock assembly 720.

The inner bezel assembly 610, is responsible for capturing the tablet computer 120, not shown. The right and left grippers 702, 704, plus the cover 701 accomplish this capture. The actuator 703, provides a user initiated motion to separate the grippers 702 and 704 to allow tablet computer insertion or removal. When the actuator is released expansion spring 706 maintains grippers, 702 and 704, in position to firmly capture the tablet computer and keep it within inner bezel assembly 610. More details of the action of the grippers 703 and 704, and actuator 703, can be seen in FIG. 15 and are discussed with that figure.

Bezel assembly 610 is assembled by placing the grippers 702, and 704 inside inner bezel 710 along with actuator 703, and securing with mechanism retainer 705. On top of that cover 701, is placed and secured with screws 707. This forms a single piece assembly 610, that captures tablet computer 120, not shown, and holds it firmly inside bezel assembly 630, not shown.

By virtue of pivot pins 601, inner bezel assembly 610 can rotate within outer bezel frame 620, not shown. Rotation lock assemblies 720 provide a detent lock between inner bezel assembly 610 and outer bezel frame 620, not shown, in only two orientations. The orientations correspond to keyboard operating mode shown in FIG. 1d and tablet operating mode shown in FIG. 1f.

Also shown in FIG. 7 is sound channel 602, and sound exit port, 430, both built into cover, 701. The usefulness of these features are discussed with FIG. 6 above. FIG. 7 illustrates that both the channel and port may be elements of the embodiment of inner bezel cover, 701.

Figure 8B:
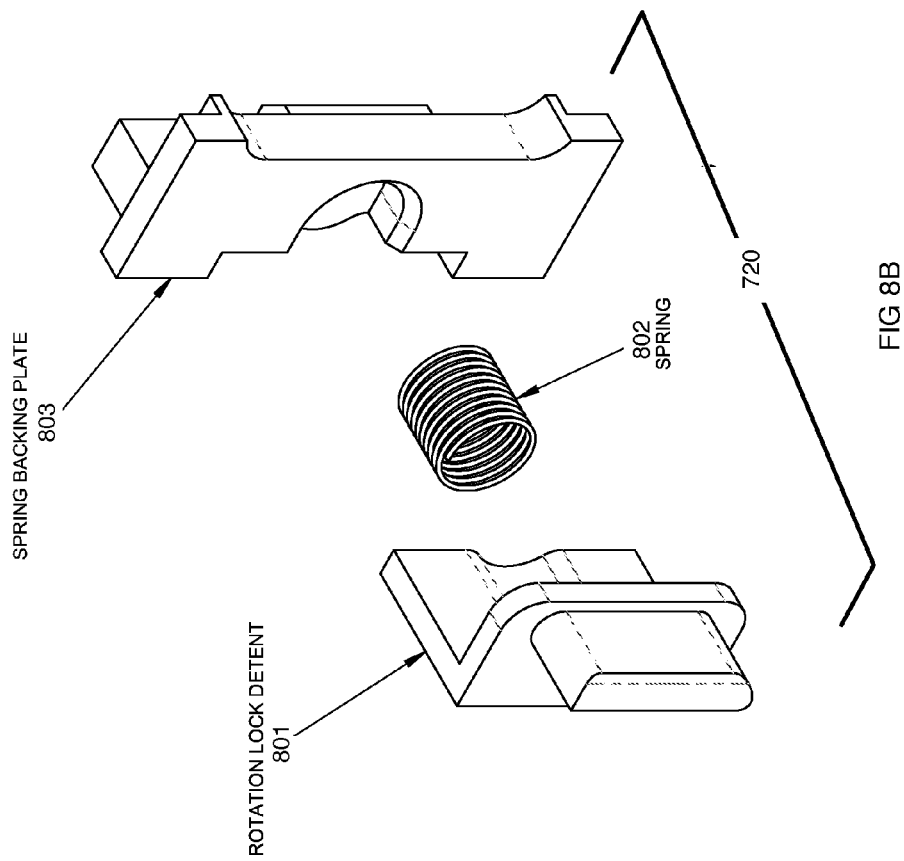
FIGS. 8a, 8b are isometric and exploded isometric views of the rotation lock assembly shown in FIG. 7.
Figure 8A:
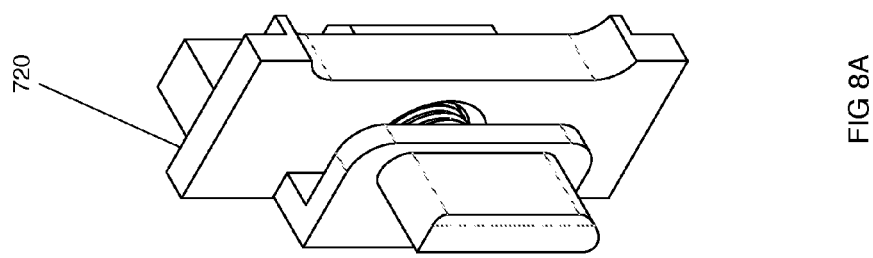

FIG. 8a shows a close up view of rotation lock assembly 720, and FIG. 8b shows an exploded view of the same. The rotation lock assembly includes the following component parts:
  rotation lock detent 801,
  rotation lock spring 802,
  and rotation lock spring backing plate, 803.

Together these components provide the rotation locking feature discussed is association with FIG. 7 above.

FIG. 9 shows an exemplary exploded view of keyboard foot assembly, 900, and the components that go in to that assembly, including:
  tilt foot body 901,
  tilt foot hinge(s) 902,
  tilt foot pin(s) 903, and
  tilt foot screw(s) 904.

Illustrated in FIG. 9 is the fact that the hinge 902 contains a section called a spring detect arm 1001. Also illustrated in FIG. 9 is the fact that tilt foot body 901 contains features called detent grooves, 1002 and 1003. These two items are also shown in more detail in FIGS. 10c and 10e respectively. To assemble the keyboard foot assembly 900, pin(s) 903 are forcefully driven through tight fitting bores in the tilt foot body and also through larger diameter bores in hinge(s) 902. The pins are securely held to body 901 by friction fit and firmly attach hinge(s) 902 to the tilt foot body 901 allowing rotation of the hinge 902 with respect to the body 901. At the same time spring detect arm 1001, a portion of hinge 902, engages with detents 1002 and 1003 in tilt foot body 901. These two detents hold the tilt foot body in two positions, namely detent 1002 holds the foot retracted and detent 1003 holds the foot open. Hinge(s) 902 and screw(s) 904 secure the hinge and attached tilt foot body to the bottom cover 502, not shown, of base assembly 101, also not shown.

FIGS. 10a-10f, further illustrate the details of construction of an embodiment of the keyboard foot assembly 900. FIGS. 10a, 10b and 10f show top, front (head on) and side views of keyboard foot assembly 900, and FIGS. 10c and 10e show the detent spring arm engaged into detent groove, 1003, holding the foot in the open position. Detail FIG. 10e shows both detent groove 1003, used to hold the foot extended or open and detent groove, 1002, used to hold the foot retracted or closed. Section C shown in FIG. 10c shows the view through the pin portion of the hinge with the foot, 901, open and the detent spring arm visible. Section D shown in FIG. 10d shows the view through the same components at a level where the detect spring arm is hidden and pin in hinge, 902, and body, 901, is shown without obstruction.

FIG. 10 illustrates another innovative property of the case. This embodiment provides a tilt foot, for elevating the keyboard base when operated in the keyboard mode, as shown in FIGS. 1c and 1d. As a part of this feature the foot will remain open or will remain closed, as the user desires, but can be transformed from one mode to the other by force suitable to overcome a position detent mechanism, as such the foot is always firmly connected to the carrying case and never becomes a loose element.

FIGS. 11a-11e illustrate exemplary detail regarding rotation of the inner bezel assembly, 610, within the outer bezel frame, 620. FIG. 11a shows bezel assembly, 630, with inner bezel assembly, 610, rotated into the keyboard operating position. tablet computer, 120, is not shown so as to not cover features of inner bezel assembly, 610. FIG. 11d is a detail view related to FIG. 11c. FIG. 11e is a detail view related to FIG. 11c. FIGS. 11d and 11e show the inner bezel pivot holes are blind holes into which pin(s), 601, engage. The engagement of pins, 601, into holes, 604, makes a permanent joining of inner bezel assembly, 610, and outer bezel frame, 620, so that the two do not separate in normal usage. The location of the pins and holes along the center of bezel assembly, 630, allows the inner bezel assembly, 610, to rotate within, and while fully captured by, outer bezel frame, 620. This construction enables one of the features of the embodiment, specifically; that tablet computer, 120, not shown, when captured in inner bezel assembly, 610, may freely rotate between operating modes, as shown in FIG. 1, while always being captured and secured to the carrying case by attachment to outer bezel frame, 620, which is in turn a part of bezel assembly, 630, which is fastened to base assembly 101 via slide hinge, 401.

Figure 12C:
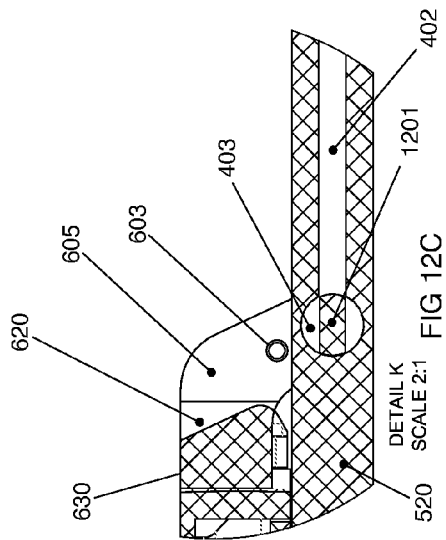
FIGS. 12a-12d are a composite of plan views and section views showing the slide and tilt mechanism of an embodiment of the present invention. The slide detail shown in 12d allows the tablet computer to displace forward with respect to the keyboard base section and tilt upward for operation in the keyboard mode. The resulting open case provides the tablet computer portion to pivot approximately ⅓ of the way along the base of the keyboard portion as shown in FIG. 13 to properly distribute the weight of the tablet computer over the base.
Figure 12D:
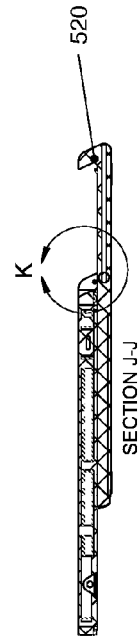
Figure 12A:
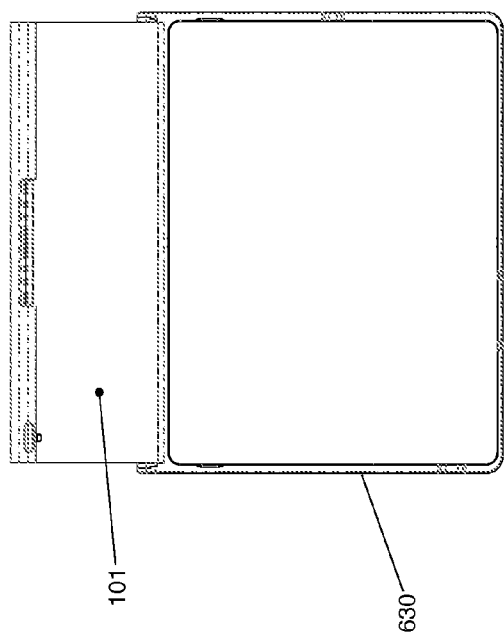
Figure 12B:
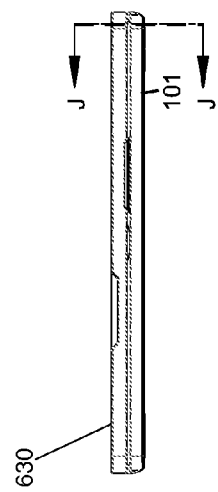

FIGS. 12*a*-12*d*, show an exemplary interconnection of the base assembly 101 and the bezel assembly, 630. Also shown in the details of FIGS. 12*b*-12*d*, is the relationship and action of the components that allow the tablet computer to tilt and slide relative to the keyboard. The embodiment shown in FIG. 12*a* is substantially the same as the embodiment of FIG. 1*b*. As shown, the case with bezel assembly, 630, is slid (translated) to its forward limit of travel on base assembly 101. FIG. 12*b* presents an exemplary side view and FIG. 12*d* is a section view taken from FIG. 12*b*. FIG. 12*b* shows the profile of keyboard housing, 520, with bezel assembly 630 mated to it. FIG. 12*c* illustrates an exemplary close-up view of the joint between keyboard housing 520, and bezel slide rotate pin, 605. In FIG. 12*c* the slot, 402, and receiver, 403, are shown in keyboard housing, 520, together with pin with flat, 1201, of bezel slide rotate pin 605, engaged in slot, 402, and ready to rotate in receiver, 403. In one embodiment, by virtue of the shape of the slot, 402, rotation is not possible until flatted region of pin, 1201, has slid forward in slot, 402, till it reaches receiver, 403. Once rotation of bezel assembly, 630, has occurred sliding motion prevented by the engagement of the round region of flatted region of pin, 1201, with slot, 402.

Because flatted region of pin 1201 is part of slide rotate pin 605 which is fastened to outer bezel frame 620 via screw(s) 603, which is in turn fastened to inner bezel 610, not shown, to form bezel assembly 630, not shown, which contains tablet computer 120, not shown. Further, because keyboard housing 520 is an integral part of base assembly 101, containing keyboard 110, not shown, in this embodiment the tablet computer cannot rotate with respect to the keyboard until it has been pulled fully forward. Other embodiments may allow such rotation.

Furthermore once rotated, flatted region of pin, 1201, prevents further sliding along slot, 402. Accordingly once the tablet computer is rotated into the keyboard operating mode the tablet computer can no longer slide along the keyboard housing in the base assembly.

The mechanism described above provides an advantageous feature of the particular embodiment of invention: the ability to rotate the tablet computer relative to the keyboard into a keyboard operating mode, as shown in FIG. 1*c*, while maintaining structural rigidity in transition well as in the operating mode.

Because the screen of the tablet computer is a touch screen the user will be pressing on it with reasonable force, even in the keyboard operating mode. As discussed above the slide pivot mechanism illustrated in FIG. 12 will prevent the screen from sliding when pressed but that mechanism will not prevent pivoting.

FIG. 13 illustrates a feature of an embodiment of the invention which prevents rotation of the touch screen by the use of magnets. Magnets offer the capability of providing a "detent like" anti-rotation feature without placing large torques on rotating elements to stop motion. Magnets also offer the innate ability to provide strong holding forces when close together with said forces dropping off rapidly as the magnets are separated. FIG. 13 illustrates how the embodiment incorporates magnets to provide an anti-rotation feature for the tablet computer holding it open but still allowing it to close freely after the user applies a momentary force to overcome the force of magnets in close proximity.

FIGS. 13*a*-13*d*, illustrate the case open in keyboard mode. FIG. 13*c* shows a section through FIG. 13*a*. FIG. 13*d* is a detail view related to FIG. 13*c*. These figures show bezel assembly, 630, in the keyboard operating mode relative to base member 101, and in FIG. 13*d* in particular keyboard housing, 520, is shown in relation to outer bezel frame, 620. Magnet(s), 1301, located within outer bezel assembly, 620, are in close proximity to magnet(s) 1302 located within keyboard housing, 520. The attractive force between the magnets keeps the carrying case open. This is accomplished without application of forces to slide hinge, 401.

FIGS. 14*a*-14*d*, illustrate details of how the tablet computer is captured within the bezel assembly. The bezel must securely grip the tablet computer, regardless of the shape of the particular tablet computer or computers which the case is compatible with. One embodiment of the invention provides for custom matching several elements of the bezel assembly, 630, to a specific tablet computer. FIGS. 14*b*-14*d* all are section views relating to FIG. 14*a*. All three sections show details of the shape that captures the tablet computer, 120, not shown. Note that in all three components; left gripper, 704, right gripper, 702, and retaining ledge, 708, there is a common curved surface and an undercut feature, 1402, that captures the tablet computer. The specific shape of feature 1402 conforms generally to the design of the tablet computer the case is intended to be used with. While many tablet computers may have similar shape along their edge one or more tablet computers may also be very different in this respect. The embodiment provides for custom design of grippers, 704 and 702, and ledge, 708, to match a selected tablet computer. By providing a very well matched shape of undercut feature, 1402, the grippers can achieve excellent fit and hold for any specific tablet computer.

Similarly, in particular embodiments, other features of bezel assembly 630, are intended to be custom matched to particular tablet computers, including:
- notch 1404, for clearance of system cable 104,
- notch 1403, for clearance of audio cable 102,
- notch 1401, for clearance of a microphone built into tablet computer, 120, (not shown),
- and the location of sound channel 602, and sound exit port 430.

FIGS. 15*a*-15*c* illustrate the elements and motion path of the gripper-actuator assembly 1501 in a particular embodiment. Referring to FIG. 7, it can be seen that the inner bezel 710 and cover 701 physically constrain the motion of the following elements shown in FIGS. 15*a*-15*c*: right gripper 702, actuator 703, and left gripper 704. Because of this constraint, the actuator can only move in the vertical direction and the grippers can only move horizontally. Detail S in FIG. 15*b* is shown enlarged in FIG. 15*c* to show the intersection of three components: actuator 703, and right and left grippers 702 and 704. Ridges and slot features 1501, 1502, 1503 and 1504 can also be seen in the actuator and grippers. The ridges and slots are an innovative element of this particular embodiment of the invention. These elements transfer vertical motion of the actuator, 703, into a horizontal motion in grippers 704 and 702. Specifically, as actuator 703 is moved upward slot 1501 in left gripper engages ridge 1502 in the actuator. The diagonal orientation of the ridge 1502 and slot 1501 translate the upward actuator motion into a rightward motion in gripper 704. At the same time, slot 1504 in right gripper engages ridge 1503 in the actuator and the same upward motion of the actuator 703 is associated with into a leftward motion in gripper 702. The combination of leftward motion in gripper 702 and rightward motion in gripper 704 means that as actuator 703 is moved upward the grippers are moved together, closing around the tablet computer, 120, not shown. Spring 706 provides an upward force to maintain the grippers closed.

To release the tablet computer, the user provides a force downward on actuator 703, opposing spring 706. As the actuator moves downward, the grippers, 702 and 704 are moved away from each other, opening and releasing the tablet computer 120, not shown.

FIGS. 16*a*-16*d*, illustrate embodiments of the slide latch 1601 and options for sensors for automatic keyboard wake up when the case is opened.

FIG. 16*a* shows a top down view of an embodiment of the carrying case closed, this is the same mode as isometric FIG. 1*a*. To open the case the first step is to slide open the case as shown in FIG. 1*b*. To allow that motion, slide latch, 1601, must be pressed. FIG. 16*b* shows a section view taken through slide latch, 1601, as seen in FIG. 16*a*. FIG. 16*c* shows a detail view related to FIG. 16*b*. Referring to FIG. 16*c* it can be seen that the downward motion of slide latch, 1601, which is contained in a cavity within keyboard housing, 520, allows a feature on bezel assembly, 630, to disengage slide latch, 1601, and allow the case to slide open whereby bezel, 630, moves away from slide latch, 1601, to the position shown in FIG. 1*b*. On the other side of the case in a position detailed in FIG. 16*d* as a section view related to FIG. 16*a*, another aspect of bezel, 630 can be seen, which will separate from a feature in keyboard housing, 520, as the case slides open. This separation can be used to automatically "wake up" the keyboard subsystem, 110, not shown. For instance in an embodiment a magnet, 1603, is located in the moving portion of the bezel, 630, and by virtue of separation from a magnetic sensor located in position 1604, of keyboard housing, 520, could provide an electrical signal to keyboard, 110, not shown, initiating a "wake up." Alternately a mechanical switch, such as a MicroSwitch manufactured by Honeywell (MicroSwitch may be a protected mark of Honeywell Inc.), could be located in position 1604, to sense the separation between keyboard housing, 520, and bezel assembly, 630, when the keyboard is slid from the closed to open position.

Those familiar with common tablet computers know that some models, such as the iPad 2 of Apple Computer, Inc., (note that "Apple Computer" and "iPad2" may be protected marks of Apple Computer, Inc.) contain magnetic flux sensors that serve as a terrestrial compass for some programs running on the tablet computer. The use of a magnet, 1603, in close proximity to such a magnetic flux sensor could cause an error in reading. To prevent such a magnet induced error, a magnetic shielding material, 1605, made from a material such as MuMetal, manufactured by MuShield Company Inc., Londonberry, N.H., (MuMetal may be a protected mark of MuShield Inc.) can be placed between the magnet and the tablet computer containing the magnetic flux sensor.

FIGS. 17*a*-17*f*, illustrate an embodiment of the rotation lock assembly, 720, in preventing rotation of the inner bezel assembly, 610, within the outer bezel frame, 620. In approaching engagement position, 1710, illustrated in FIGS. 17*a*-17*c*, detail FIG. 17*c* shows rotation lock detent, 801, a component of rotation lock, 720, mounted on inner bezel assembly, 610, just beginning to engage outer bezel frame, 620, near indent feature, 1701. Rotating a slight bit further to lock engaged position, 1720 depicted in FIGS. 17*d*-17*f*, detail FIG. 17*f* shows rotation lock detent 801, has seated into indent feature 1701, on outer bezel frame, 620. The seating of rotation lock detent, 801, into indent feature, 1701, provides a force to hold inner bezel assembly, 610, from further rotation in outer bezel frame, 620. A slight force to overcome the spring force of rotation lock spring, 802, on rotation lock detent, 801, will move the detent, 801, out of indent, 1701, and allow further rotation.

FIGS. 18-23 illustrate alternate embodiments of a tablet computer carrying case and components thereof.

Figure 18:
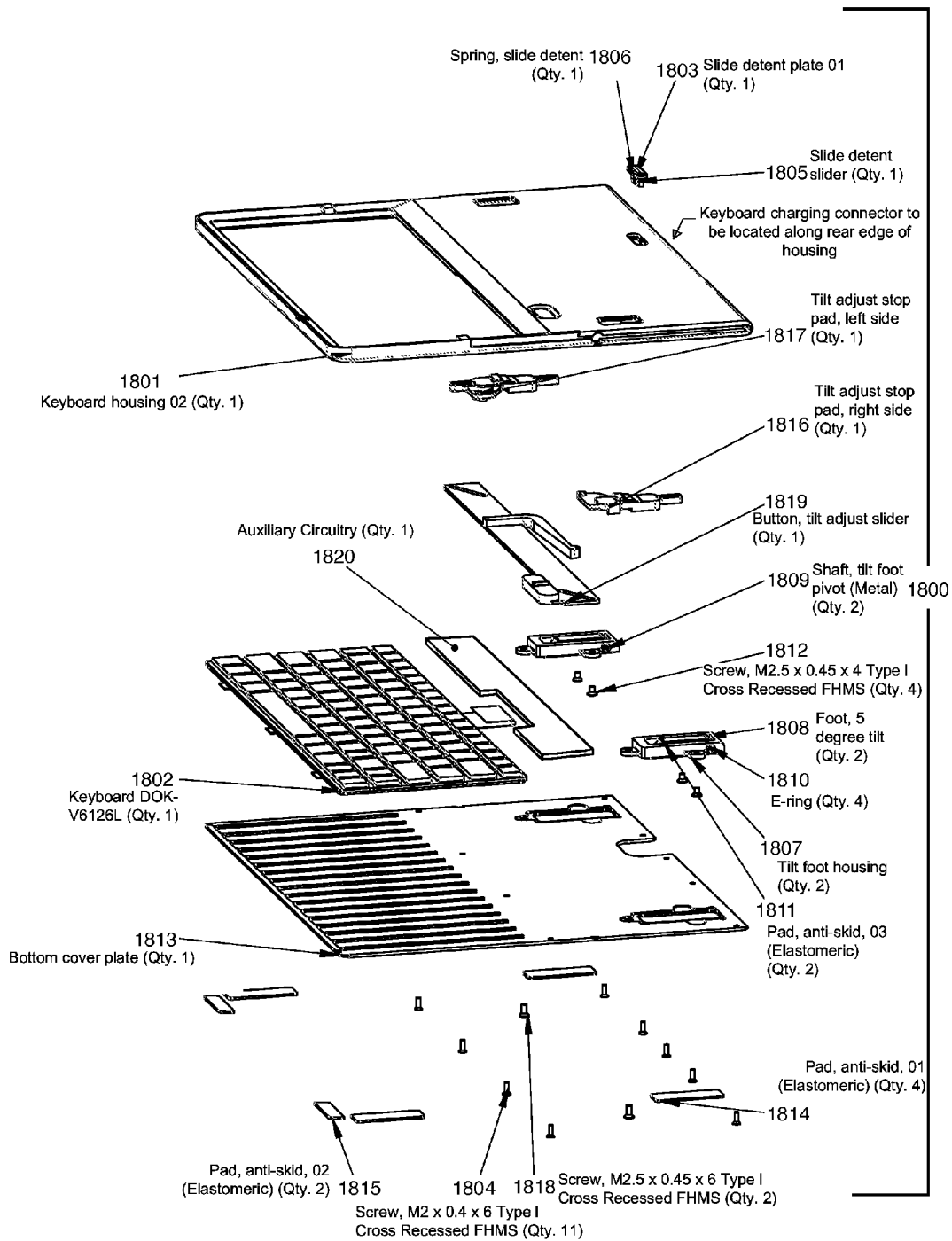
FIG. 18 shows an exploded view and bill of materials for an alternate design of the base assembly which holds the keyboard, and a bill of materials for that assembly.

FIG. 18 illustrates an exploded view of an alternative embodiment of a base assembly 1800. This is an alternative embodiment of base member (or base assembly) 101, discussed above. Base Assembly 1800 duplicates base member 101 in form and function but uses many different mechanisms. Elements of alternative base assembly 1800 can be mixed and matched with elements of the base member 101, and further the invention is not limited to only the elements of either design. Components of base assembly 1800 may include, for example and without limitation:

alternate base assembly 1800,
    alternate keyboard housing 1801,
    alternate keyboard 1802,
    slide detent plate 1803,
    screw 1804,
    slide detent slider 1805,
    slide detent spring 1806,
    tilt foot housing 1807,
    tilt foot, 5 degree 1808,
    tilt foot pivot shaft 1809,
    e-ring fastener 1810,
    anti-skid pad 1811,
    screw 1812,
    bottom cover plate 1813,
    anti-skid pad 1814,
    anti-skid pad 1815,
    tilt adjust stop—right 1816,
    tilt adjust stop—left 1817,
    screw 1818,
    tilt adjust slider button 1819, and
    auxiliary circuitry 1820.

Figure 19:
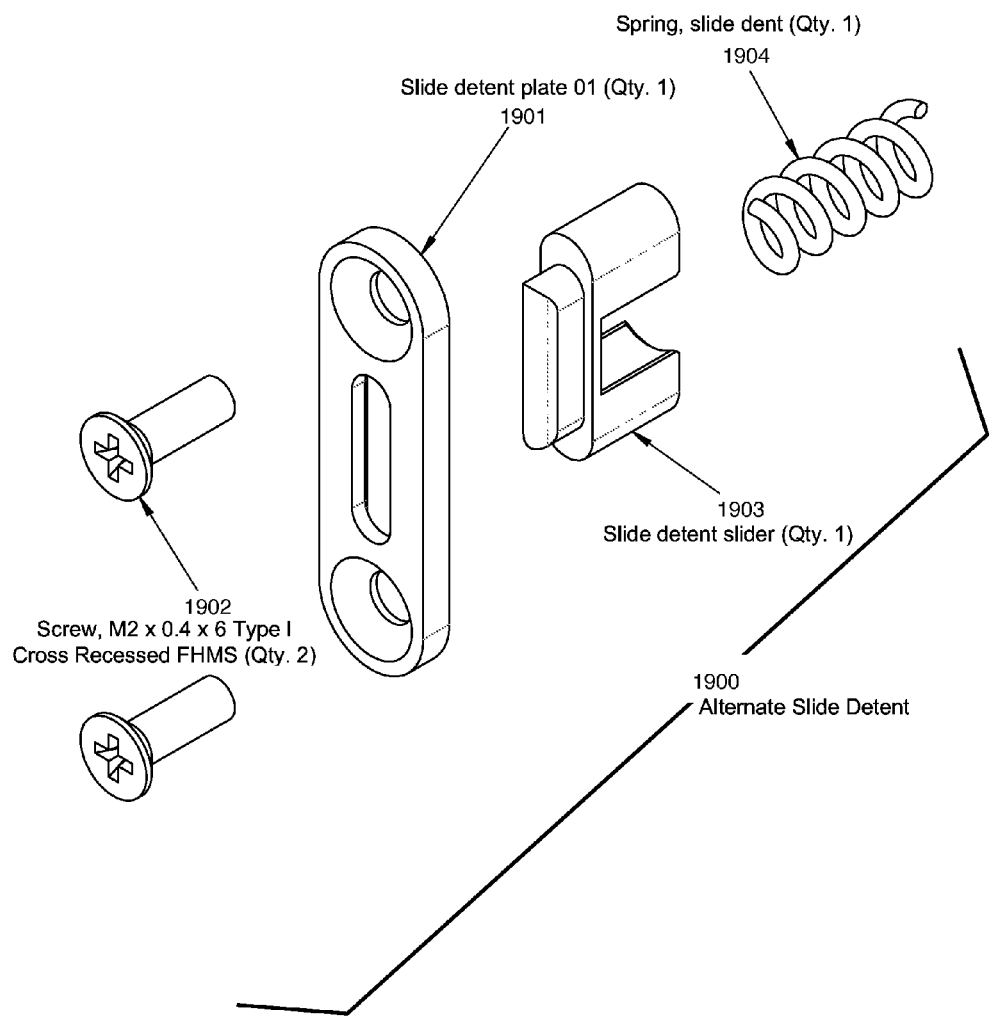
FIG. 19 shows an isometric exploded view for an alternate design of the rotation-swivel detent mechanism and a bill of materials for that assembly.

FIG. 19 illustrates an alternate slide detent, 1900. This sub-assembly also functions as an alternate embodiment of rotation lock assembly, 720, illustrated in FIGS. 8*a*-8*b*. Such assemblies may be used to lock the sliding motion of bezel assembly, 630, relative to base assembly 101 illustrated in FIG. 4 or the rotation motion of bezel assembly, 630, relative to base assembly 101 as illustrated in FIG. 12. Alternate slide detent may be applied alternately in multiple places in the embodiments described above. Components of alternate slide detent, 1900, include:

slide detent plate 1901,
    screw 1902,
    slide detent slider 1903, and
    slide detent spring 1904.

Figure 20:
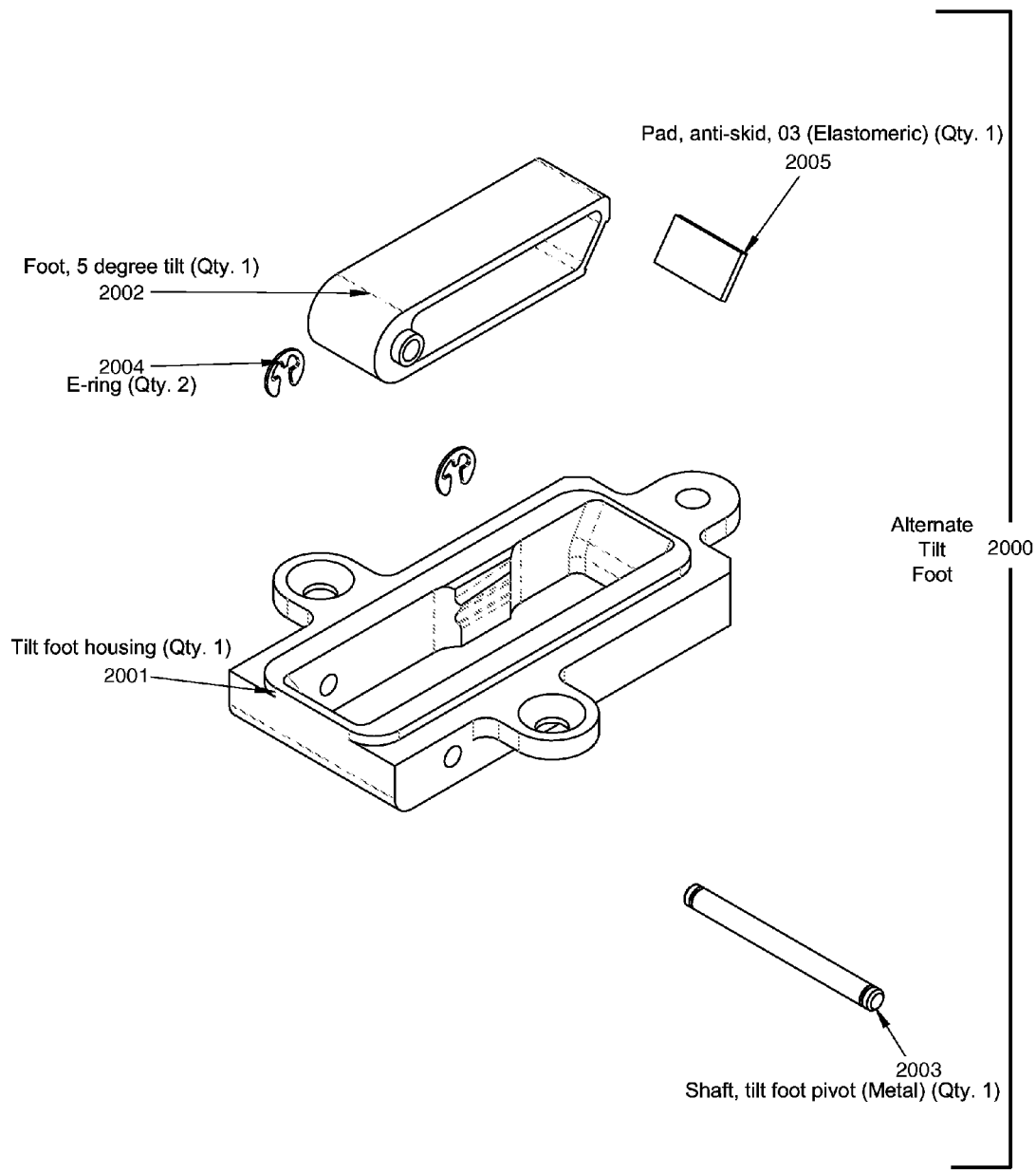
FIG. 20 shows an isometric exploded view for an alternate design of the tilt-foot mechanism and a bill of materials for that assembly.

FIG. 20 illustrates an alternate tilt foot assembly, 2000. Using this alternate tilt foot, 2000, is a design option to using tilt foot assembly, 900, illustrated in FIG. 9. Both have been designed to tilt the case when operated in the keyboard mode as shown in FIG. 1*c*. Components of the alternate tilt foot, 2000, include:

tilt foot housing 2001,
    tilt foot, 5 degree 2002,
    tilt foot shaft 2003, tilt foot e-ring 2004, and anti-skid pad 2005.

Figure 21:
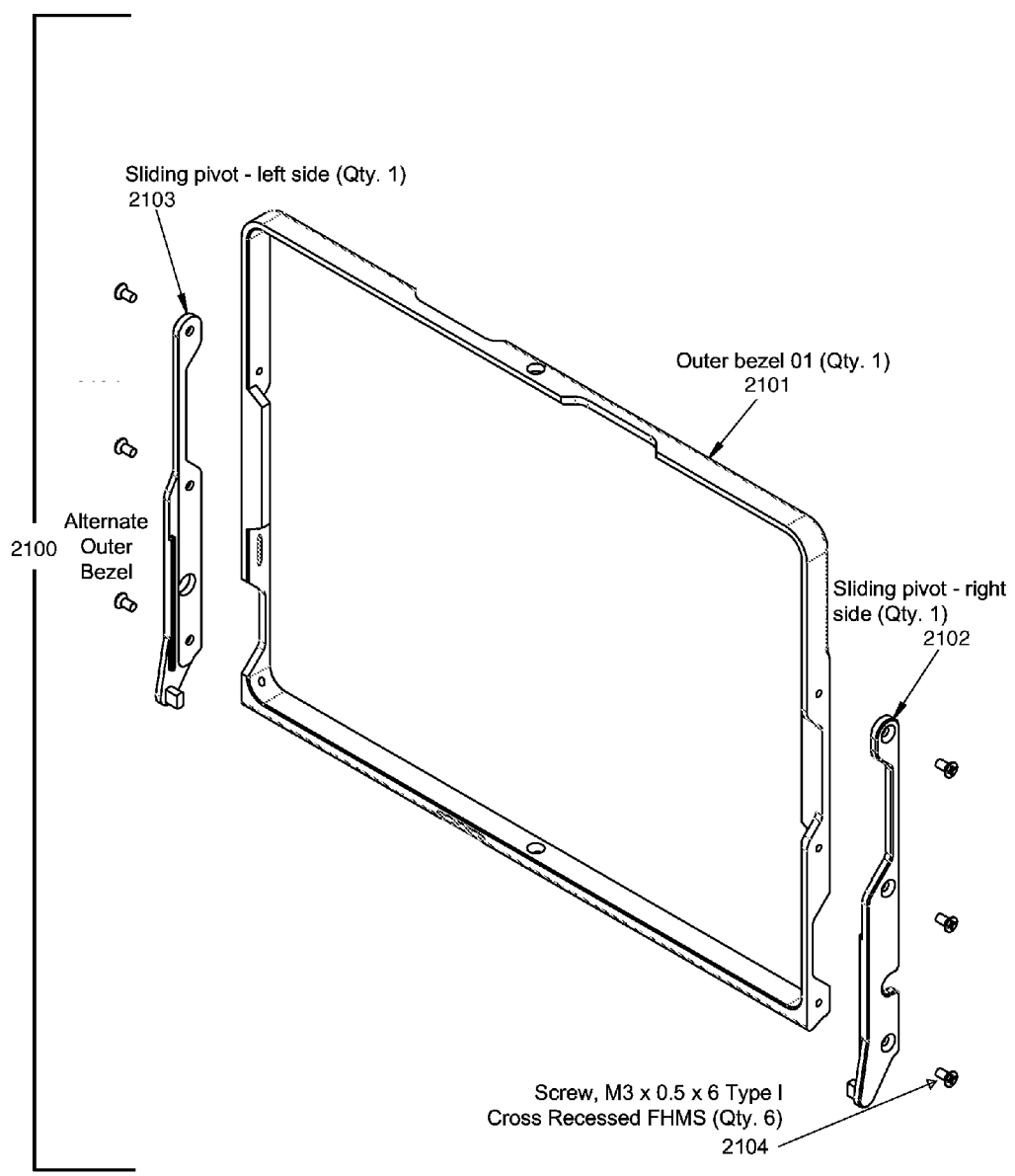
FIG. 21 shows an isometric exploded view for an alternate design of the outer bezel assembly and a bill of materials for that assembly.

FIG. 21 illustrates an alternate outer bezel assembly, 2100. This assembly can be used in place of outer bezel frame, 620, and slide rotate pins, 605 and 606, illustrated in FIGS. 6 and 4. The key difference in the two designs is the method in which the sliding pivot feature (found in initially discussed embodiment slide rotate pins, 605 and 606) is implemented. There are also other alternate implementations not shown. Components of the alternate outer bezel assembly include:

outer bezel 2101, sliding pivot—right side 2102, sliding pivot—left side 2103, and screw 2104.

Figure 22:
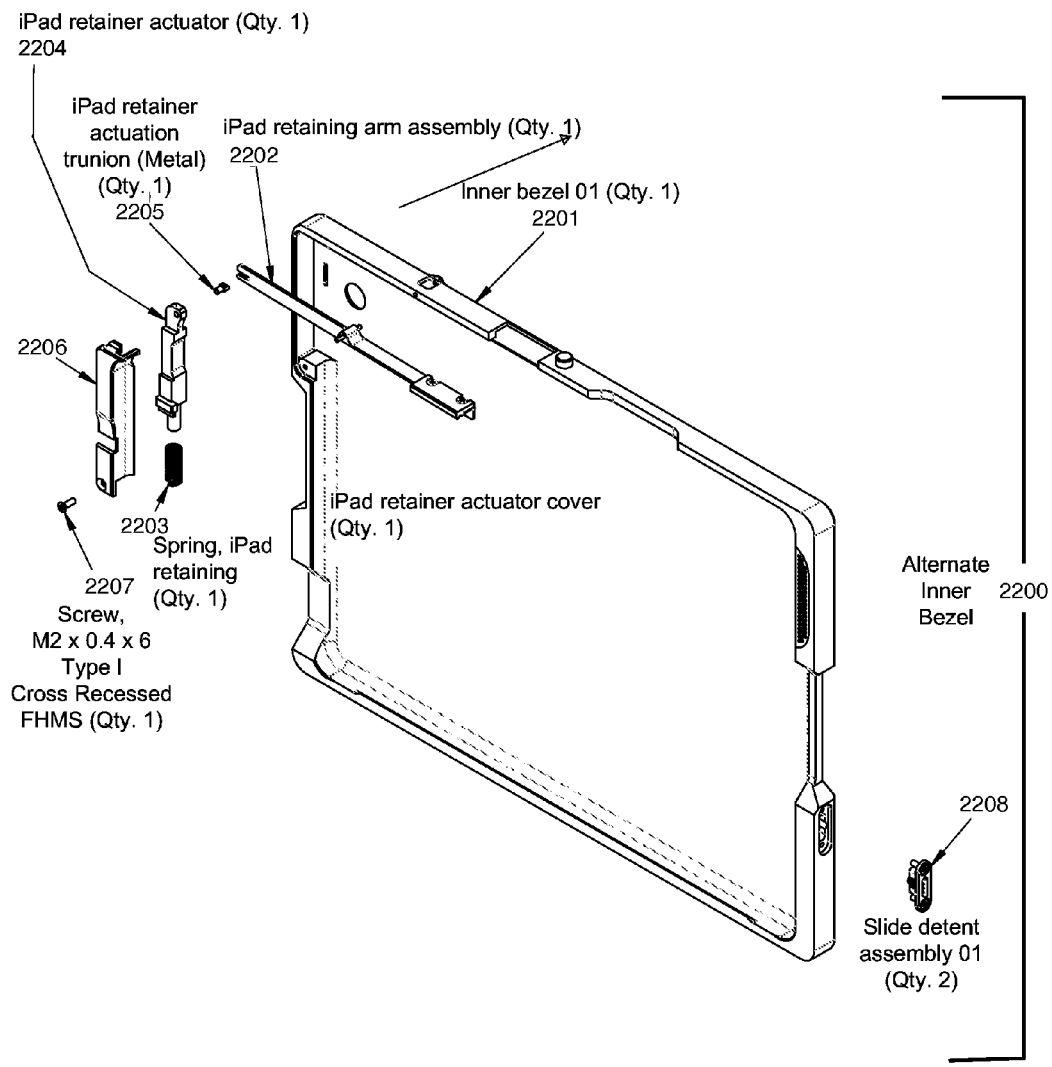
FIG. 22 shows an isometric exploded view for an alternate design of the inner bezel assembly with an alternate version of a tablet computer retainer mechanism and a bill of materials for that assembly.

FIG. 22 illustrates an alternate inner bezel assembly, 2200. This design can be used in place of inner bezel assembly, 610, illustrated in FIGS. 6, 7 and 15. This alternate design incorporates an alternate mechanism for gripping the tablet computer, 120, not shown, and also illustrates the use of alternate slide detent, 1900, illustrated in FIG. 19. There are other alternate implementations of the inner bezel not shown. Components of the alternate inner bezel assembly, 2200, include:

inner bezel 2201, iPad retaining arm assembly 2202, iPad retaining spring 2203, iPad retaining actuator 2204, iPad retainer actuation trunion 2205, retainer actuator cover screw 2206, screw 2207, and slide detent assembly 2208.

Figure 23:
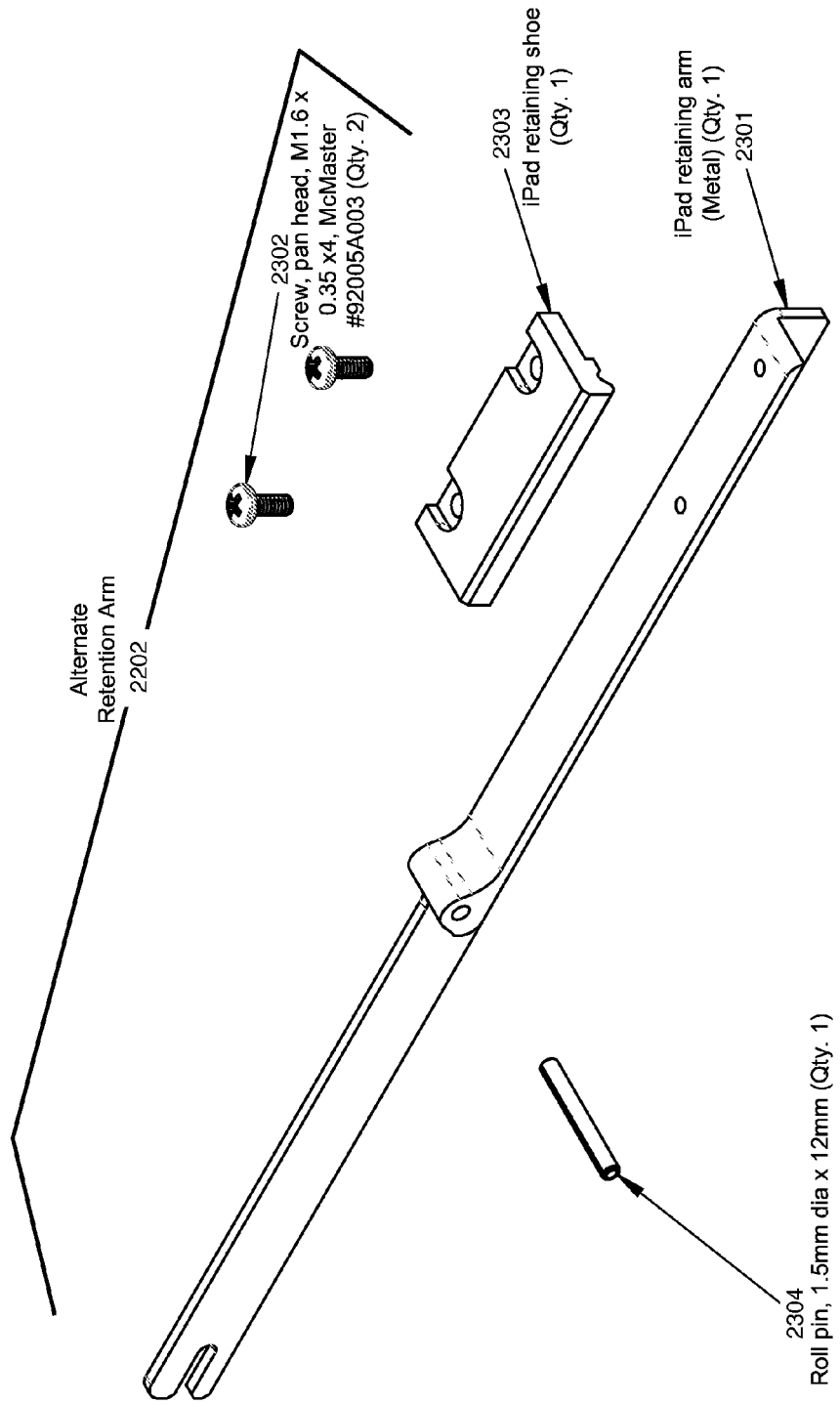
FIG. 23 shows an isometric exploded view for an alternate design of an alternate tablet retainer arm assembly and a bill of materials for that assembly.

FIG. 23 is an exemplary exploded view of the alternate retaining arm, 2202, illustrated in FIG. 22 as a component of the alternate inner bezel assembly, 2200. The retaining arm, 2301, is driven by actuator, 2024, not shown. Retaining shoe, 2303, engages the tablet computer, 120, not shown, and through screw(s), 2302, and roll pin, 2304, securely connects the tablet computer to the retaining arm, 2202, and in turn to the alternate inner bezel as illustrated in FIG. 22. Alternate retaining arm assembly, 2202, is an alternate embodiment of the gripper-actuator assembly, 1510, illustrated in FIG. 15. Assembly 1510 is a more rugged embodiment because it offers two grippers, 702 and 704, as opposed to the single shoe, 2303, of the alternate embodiment.

FIGS. 24a-24b, illustrate the camera openings and features provided in one embodiment to attach an optional lens. To make optimal use of the camera built into most tablet computers this embodiment provides openings for the camera to obtain a clear view through the protective portions of the case. In addition this embodiment provides features and fastening sites for an optional lens that will adapt the system for particular applications, for instance; imaging a distant screen such as at some large technical conferences or a close white board such as in some classrooms or company meeting rooms.

FIG. 24a details the location of the primary camera opening, 2401, and the secondary camera opening, 2402, in the surface of the bezel assembly, 630. These openings are used when the case is operating in the keyboard mode as shown in FIG. 1c. The specific location of the openings depends on the model of tablet computer being used, the selection of primary or secondary opening is made when the tablet computer, 120, not shown, is placed in the bezel assembly, 630, by virtue of the orientation of the tablet computer in the bezel assembly.

FIG. 24a also shows details of features around both openings, 2401 and 2402, that allow alignment and attachment of an optional external lens, 2410, shown in FIG. 24b. Specifically; lens alignment ridge, 2403, provides a feature that centers external lens, 2410, with respect to camera opening, 2401, or 2402, and lens fastening threaded feature, 2404, provides a means to secure the optional lens, 2410, to bezel assembly, 630, keeping it securely attached and aligned with the selected camera opening, 2401 or 2402. Alternately lens alignment ridge, 2403, could be a printed indicator mark offering visual alignment assistance but no physical feature on the case.

Figure 1F:
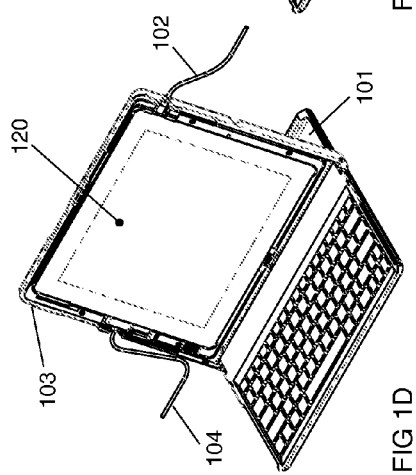

FIGS. 25a and FIG. 25c, which is a detail view related to FIG. 25a show a camera opening, in the base 101. In a particular embodiment this camera opening will be used when the case is operated in the tablet mode as shown in FIG. 1f.

The underside of base 101, shown in FIGS. 26a-26b, contains alignment and attachment lens features, 2403 and 2404, to facilitate optional lens, 2410, attachment to the keyboard housing component, 520, of base 101 in which the lens is centered around base camera opening, 2501, (In the same manner as the features provided centered and aligned attachment of optional lens, 2410, to the camera openings, 2401 and 2402, on bezel assembly, 630).

FIG. 25a and FIG. 25b (a detail view associated with FIG. 25a) show numerous examples of MicroSwitch engagement tabs, 2502, that can be used to activate switches or sensors to automatically set operating modes when the case is slid open. These are alternate embodiments of the magnetic and sensor system shown in FIG. 16d incorporating magnet, 1603, and sensor, 1604. The tabs, 2502, show a range of shapes and designs that can all be used to sense the position of the sliding bezel assembly, 630, with respect to keyboard housing, 520. Having two sensors that trip at different separations between housing, 520, and bezel, 630, can provide information as to whether the system is open, closed in carrying mode, or closed in tablet mode.

Some embodiments of this invention contain electronic circuitry in the base assembly that performs a number of functions including without limitation:

providing a wireless signal between the keyboard and the tablet computer;

enabling or implementing optional features without making changes to the tablet computer;

keyboard battery charging; and providing an interconnection between sensors and switches that automatically sense the operating mode of the case.

Figure 27B:
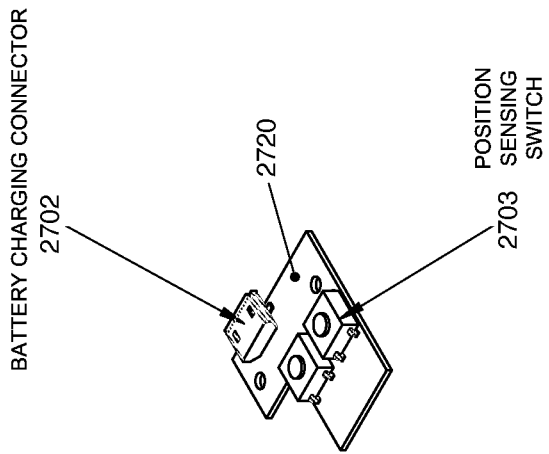
FIGS. 27a-27b are isometric views of the auxiliary electronics circuits located in the base and associated with the keyboard plus details of the mechanical position sensing switches located in the base.
Figure 27A:
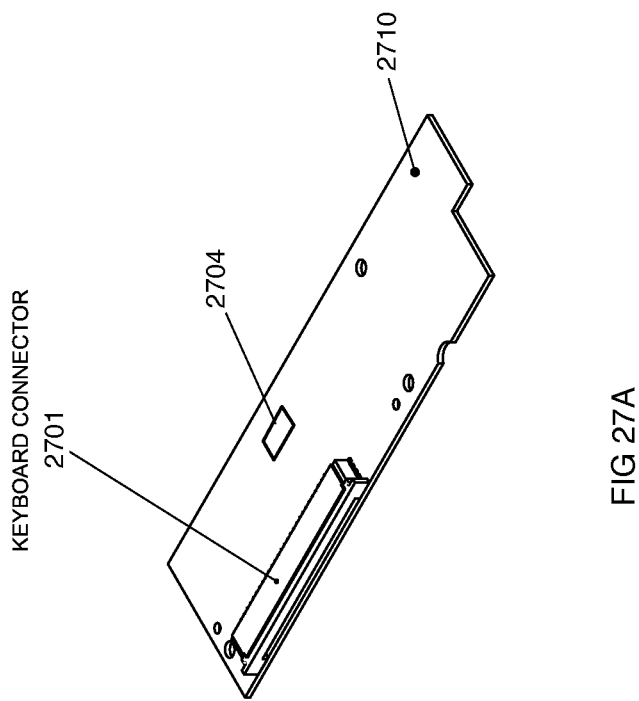

FIGS. 27a-27b, show examples of printed circuit boards (PCB's) that may be used to implement this circuitry. The specific shape of a PCB will depend on the details of its function and the mechanism and embodiment into which it is placed. The designs shown in FIG. 27 are examples of one embodiment.

FIG. 27a shows keyboard auxiliary PCB, 2710, which contains keyboard connector, 2701, and auxiliary circuitry, 2704, in addition to other items not shown. This PCB makes physical connection to the keyboard and provides circuitry for wireless communication to the tablet computer and implementation of optional features.

FIG. 27b shows sensor switch PCB, 2720, containing battery charging connector, 2702, and position sensing switch (s), 2703. In one embodiment the charging connector is a standard USB connector and the circuitry within PCB, 2720, is designed specifically to make use of the 5 Volts DC available on the standard USB bus for powering and charging accessories, or when a cable with a standard USB jack is plugged into the charging connector, 2702, and the other end of the cable is attached to a power supply module or battery.

FIGS. 28a and 28b illustrate, generally and in detail, an exemplary feature of outer bezel frame 620, namely, switch activation relief 2801. The switch activation relief 2801 may be used in conjunction with, for example, the position sensing switches 2703 shown in detail in FIG. 27*b* and also in conjunction with an embodiment engaging with MicroSwitch engagement tabs 2502, shown in FIG. 25*b*). Relief 2801(also referred to herein as a "relief detail") is a recess built into outer bezel frame 620. As the bezel frame 620 rotates with respect to base 101, not shown, relief 2810 may be aligned with or not aligned with a sensor such as switch 2703. This provides a mechanism for switch 2703 to indicate the position of the outer bezel frame and automatically recognize when the case is in a particular mode such as open in the keyboard mode shown in FIG. 1*c*.

Figure 29:
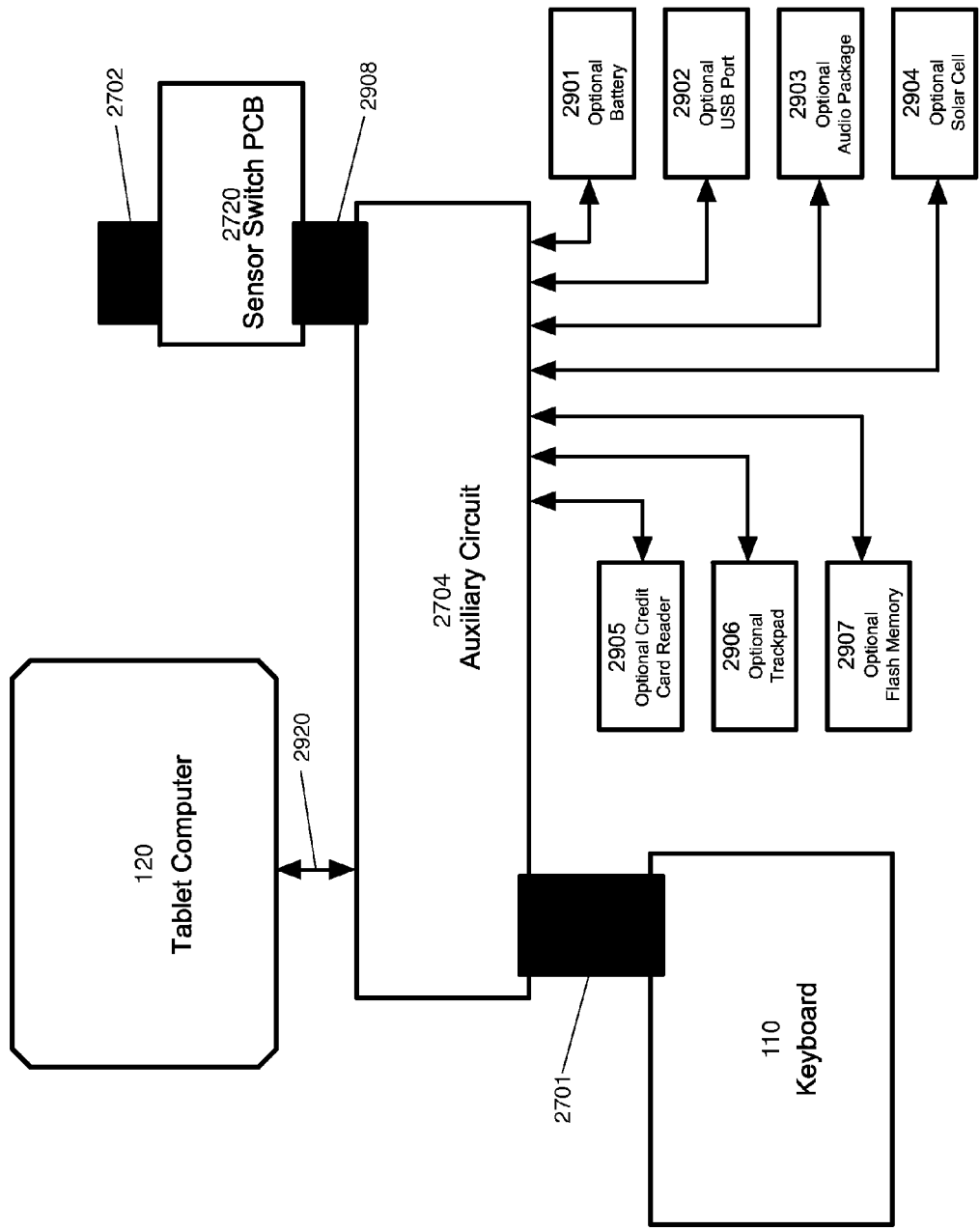
FIG. 29 is a system block diagram showing the wired interface of the keyboard and various optional features with the auxiliary circuitry located in the base and the wireless communication between the tablet computer and the auxiliary circuitry.

FIG. 29 is a block diagram of the electronic hardware and firmware systems of an embodiment of the invention identifying the subsystems and showing their interconnections. Illustrated in FIG. 29 is the fact that there is only wireless communication, 2920, to and from the tablet computer, 120. Said wireless communication may be via WiFi or Bluetooth protocols or any of the other wireless methods in use at the time of application of the invention. It is a feature of one embodiment of the invention that all standard and optional functions are implemented without physical, hardwire, connection to the tablet computer. Other embodiments may incorporate physical, hardwired connections between the tablet computer and other subsystems including the keyboard.

Illustrated in FIG. 29 is auxiliary circuit, 2704, which can be considered the central subsystem of an embodiment of the invention. Auxiliary circuit, 2704, connects via keyboard connector, 2701, to the keyboard, 110, and via charging circuit connector, 2908, to the sensor switch PCB, 2720. Also illustrated in FIG. 29 is that, in one embodiment, all optional features interact both electronically and with firmware to the system through auxiliary circuit, 2704. Such optional features may include, for example and without limitation:

Optional battery, 2901, for powering the keyboard and other optional features;

Optional USB Port, 2902, which interfaces via hardware to auxiliary circuit, 2704, and through firmware in auxiliary circuit, 2704, and application specific software in tablet computer, 120, provides the system with a USB port without physical hardwired connection to the tablet computer, 120;

Optional audio package, 2903, which provides optional, and in some embodiments stereo, speakers and microphones, built into the system. As in the optional USB port above the optional audio package interfaces via hardware to auxiliary circuit, 2704, and through firmware in auxiliary circuit, 2704, and application specific software in tablet computer, 120, provides the system with an optional audio package without physical hardwired connection to the tablet computer, 120;

Optional solar cell, 2904 which connects to auxiliary circuit, 2704, and provides power to the keyboard system, optional feature systems or to change the optional battery, 2901;

Optional credit card reader, 2905, which connects to auxiliary circuit, 2704 and provides the system with the ability to read credit cards or similar data cards. As in the optional USB port above the optional credit card reader, 2905, interfaces via hardware to auxiliary circuit, 2704, and through firmware in auxiliary circuit, 2704, and application specific software in tablet computer, 120, provides the system with an optional credit card reader package without physical hardwired connection to the tablet computer, 120;

Optional trackpad, 2906, provides the system with a trackpad feature incorporated by many popular programs. As in the optional USB port above the optional trackpad, 2906, interfaces via hardware to auxiliary circuit, 2704, and through firmware in auxiliary circuit, 2704, and application specific software in tablet computer, 120, provides the system with an optional trackpad package without physical hardwired connection to the tablet computer, 120; and Optional flash memory, 2907, provides the system the ability to read and use flash memory devices to enhance system capability. As in the optional USB port above the optional flash memory, 2907, interfaces via hardware to auxiliary circuit, 2704, and through firmware in auxiliary circuit, 2704, and application specific software in tablet computer, 120, provides the system with an optional flash memory package without physical hardwired connection to the tablet computer, 120. Said flash memory, 2907, may be demountable from the base 101 and include a standard USB connector to allow physical connection to computers other than the tablet computer for which the carrying case is designed for.

Figure 30:
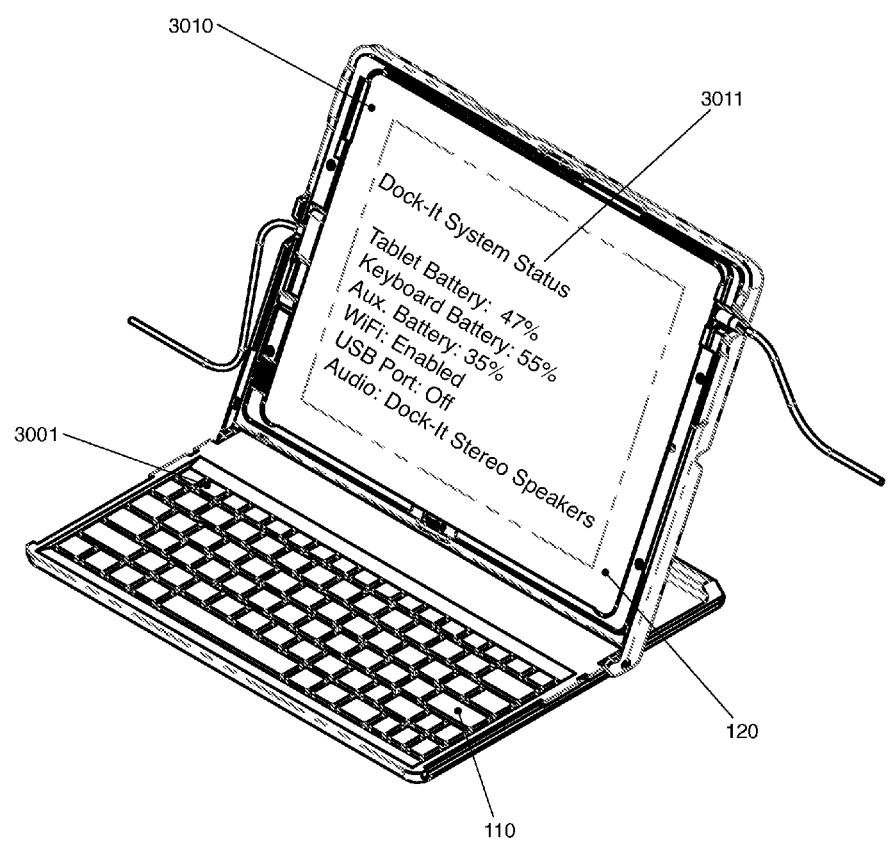
FIG. 30 is an isometric view of an embodiment operating in the keyboard mode. In this view an application specific key on the keyboard has been pressed and an application specific program in the tablet computer has responded to the key press with a status report of the system including charge level of the tablet computer and keyboard batteries.

Illustrated in FIG. 30 is the system of an embodiment operating in the keyboard mode with tablet computer, 120, and keyboard, 110, configured like a laptop computer. There is an application specific key, 3001, on the keyboard labeled "status" or some alternate marking. When that key is pressed an application specific program, 3010, sometimes called an "app" runs on the tablet computer, 120, and causes it to display the system status, 3011, which may include battery charge state and other details of the system. The application specific key, 3001, is a hardware feature of the keyboard subsystem and the program running in the tablet computer, 3010, is a software product running in the tablet computer. It is a unique aspect, in one embodiment, that data flows wirelessly, 2920, (not shown) so that the battery level of the keyboard and tablet computer batteries can both be displayed when the key, 3001, is pressed, with no physical connection between the tablet computer, 120, and the keyboard, 120. Other embodiments may incorporate physical hardwired connections to the tablet computer.

Various aspects and features of embodiments disclosed herein are set forth, for example and without limitation, in the following numbered clauses:

1. A carrying case for a tablet computer, the carrying case including:
    a base member including a keyboard housing to receive a keyboard; and
    a frame member to retain a tablet computer, the frame member being slidably and rotatably coupled to the base member.
2. The carrying case of clause 1 wherein the frame member is slidably and rotatably coupled to the base member via a slide hinge that prevents rotation of the frame member relative to the base member until the frame member has slid, relative to the base member, a predetermined distance from a closed position.
3. The carrying case of clause 1 wherein the base member and the frame member include one or more pins and slots in combination.
4. The carrying case of clause 2 wherein the combination of one or more pins and slots prevents sliding of the frame member relative to the base member upon rotating the frame member to a nonzero angle relative to the base member.
5. The carrying case of clause 4 wherein the one or more pins are of essentially cylindrical shape with flats that engage a correspondingly shaped slot in such a way as to prevent sliding of the frame member relative to the base member upon rotating the frame member to a nonzero angle relative to the base member.
6. The carrying case of clause 1 wherein the frame member includes an outer bezel slidably and rotatably coupled to the base member and an inner bezel to retain the tablet computer, the inner bezel being rotatably coupled to the outer bezel such that the axis of rotation between the inner and outer bezels is substantially orthogonal to the axis of rotation between the outer bezel and the base member.
7. The carrying case of clause 6 wherein the inner bezel is rotatably coupled to the outer bezel via a rotational joint that allows the inner bezel to be rotated at least 180 degrees relative to the outer bezel to enable the carrying case to be disposed in a closed configuration with a display of the tablet computer facing toward the base member or disposed in an open configuration with the display of the tablet computer facing away from the base member in a user-accessible orientation.
8. The carrying case of clause 1 further including a latch mechanism to secure the frame member to the base member in a closed position.
9. The carrying case of clause 8 where the latch mechanism automatically engages to secure the frame member to the base member when the frame member is slidably translated to a predetermined position relative to the base member upon closure.
10. The carrying case of clause 9 where the latch mechanism includes a spring-activated mechanism.
11. The carrying case of clause 1 wherein the base member includes a magnet disposed within the keyboard housing to activate a magnetic sensor in the tablet computer when the frame member is slidably translated to a closed position with respect to the base member.
12. The carrying case of clause 11 wherein the frame member includes magnetic shielding to prevent degradation of fluxgate magnetic sensor readings of the tablet computer.
13. The carrying case of clause 1 further including a keyboard disposed within the keyboard housing, the keyboard including circuitry to enable radio communication with the tablet computer.
14. The carrying case of clause 13 wherein the circuitry to enable radio communication includes circuitry to enable radio communication in accordance with a Bluetooth protocol.
15. The carrying case of clause 13 wherein the circuitry to enable radio communication includes circuitry to enable radio communication in accordance with a WiFi protocol.
16. The carrying case of clause 1 wherein the base member includes a receptacle to receive one or more batteries.
17. The carrying case of clause 1 wherein the frame member is rotatable through an angle of at least 100 degrees relative to the base member before reaching a resting angle in which a user may access the keyboard.
18. The carrying case of clause 17 further including a movable stop enable adjustment of the resting angle of the frame member relative to the base member.
19. The carrying case of clause 1 further including a restraining mechanism, and wherein the frame member engages the restraining mechanism when rotated to one or more particular angles of rotation relative to the base member.
20. The carrying case of clause 19 wherein the restraining mechanism includes one or more magnets.
21. The carrying case of clause 1 wherein the frame member includes a recess with a protruding lip to retain one edge of the tablet computer as it is inserted into the case, the protruding lip enabling the tablet computer to rest in portrait orientation in frame member when the carrying case is configured for user keyboard access.
22. The carrying case of clause 1 wherein the frame member includes relief details to allow a user to access an edge of tablet computer when releasing the tablet computer from the frame member.
23. The carrying case of clause 1 wherein the frame member includes relief details for both keyboard and tablet modes of operation.
24. The carrying case of clause 1 wherein the frame member includes one or more openings to allow use of a backside camera of the tablet computer.
25. The carrying case of clause 24 wherein base member includes one or more openings to allow use of the backside camera of the tablet computer when the frame member is disposed parallel to the base member and a touch screen of the tablet computer faces away from the base member.
26. The carrying case of clause 1 wherein the frame member includes a sound redirection structure to redirect sound from a speaker of the tablet computer user when the user is facing a touch screen of the tablet computer.
27. The carrying case of clause 1 wherein the frame member includes a sound redirection structure to redirect sound from a user towards a microphone of the tablet computer microphone when the user is facing a touch screen of the tablet computer.
28. The carrying case of clause 1 wherein the base member includes a mounting receptacle to receive a removable memory device that, when mounted within the mounting receptacle, can be electronically accessed by the tablet computer.
29. The carrying case of clause 1 further including data card reader coupled to at least one of the frame member or the base member.
30. The carrying case of clause 29 wherein the data card reader includes a magnetic stripe reader to read magnetic stripe cards such as credit cards.
31. A carrying case for a tablet computer, the carrying case including:
a base member;
a frame member coupled to the base member and including (i) a recess with a protruding lip to receive a first edge of the tablet computer as it is inserted into the carrying case, and (ii) a retractable latching mechanism that may be moved to a retracted position to enable a second edge of the tablet computer to be inserted within the frame member and then released to a non-retracted position to secure the second edge of the tablet computer within the frame member, the first and second edges being opposite edges of the tablet computer.
32. The carrying case of clause 31 wherein the retractable latching mechanism automatically engages the tablet computer when the tablet computer is inserted into frame member.
33. The carrying case of clause 32 further including an ejector to assist a user in releasing the tablet computer from the frame member.
34. The carrying case of clause 33 wherein the retractable latching mechanism includes a user-activated release to allow a user to disengage the tablet computer from frame member, and wherein the ejector includes one or more springs to push the tablet computer free from the frame member when the user activates the user-activated release.

35. The carrying case of clause 31 wherein the retractable latching mechanism includes one or more springs.

36. The carrying case of clause 31 wherein the retractable latching mechanism includes a user-activated release to allow a user to disengage the tablet computer from frame member.

37. The carrying case of clause 31 wherein the frame member includes relief details to allow a user to access an edge of the tablet computer when releasing the tablet computer from frame member.

38. The carrying case of clause 31 wherein the frame member includes one or more openings to allow use of a camera built into the tablet computer.

39. The carrying case of clause 38 wherein the one or more openings in the frame member comprise an optical accessory mounting receptacle.

40. The carrying case of clause 31 wherein the base member includes one or more openings that form an optical path for a camera built into the tablet computer, the one or more openings including an optical accessory mounting receptacle.

41. The carrying case of clause 31 wherein the frame member includes a sound redirection structure to redirect sound from a speaker of the tablet computer towards a user when the user is facing a touch screen of the tablet computer.

42. The carrying case of clause 31 wherein the frame member includes a sound redirection structure to redirect sound from a user towards a microphone of the tablet computer when the user is facing a touch screen of the tablet computer.

43. The carrying case of clause 31 wherein the base member includes a mounting receptacle to receive a removable memory device that, when mounted within the mounting receptacle, can be electronically accessed by the tablet computer.

44. The carrying case of clause 43 wherein the mounting receptacle to receive a removable memory device includes a universal serial bus port.

45. The carrying case of clause 31 further including a data card reader coupled to at least one of the frame member or the base member.

46. The carrying case of clause 45 where the data card reader includes a magnetic stripe reader to read magnetic stripe cards such as credit cards.

47. The carrying case of clause 31 further including a radio transmitter/receiver to enable communication with devices other than the tablet computer.

48. The carrying case of clause 47 where the radio transmitter/receiver includes circuitry to enable communications with devices other than the tablet computer using a Near Field Communications protocol.

49. A carrying case for a tablet computer, the carrying case including:
    means for receiving a first edge of the tablet computer as it is inserted into the carrying case; and
    means for retractably latching a second edge of the tablet computer, the means for retractably latching the second edge of the tablet computer being movable to a retracted position to enable the second edge of the tablet computer to be received within the carrying case, and then released to a non-retracted position to secure the second edge of the tablet computer within the carrying case, the first and second edges being opposite edges of the tablet computer.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the term "coupled" is used herein to express a direct connection as well as a connection through one or more intervening circuits or structures. The terms "exemplary" and "embodiment" are used to express an example, not a preference or requirement.

Various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. A carrying case for a tablet computer, the carrying case comprising:
    abuse member; and
    a frame member coupled to the base member and including
        (i) a recess to receive a first edge of the tablet computer as it is inserted into the carrying case and provide a foundation, immovable with respect to the frame member, to support the weight of the tablet computer at least temporarily, and (ii) a retractable latching mechanism that may be;
        moved to a retracted position to enable a second edge of the tablet computer to be inserted within the frame member and then released to a non-retracted position to secure the second edge of the tablet computer within the frame member, and
        returned to the retracted position, without requiring application of force to the tablet computer, to free the second edge of the tablet computer from the frame member.

2. The carrying case of claim 1 wherein the retractable latching mechanism comprises an actuator and may be moved to the retracted position through any one of at least two options, including (i) application of force to the actuator without requiring application of force to the tablet computer and (ii) prior to insertion of the second edge of the tablet computer within the frame member and while the tablet computer rests within the recess, application of force to the tablet computer in a direction perpendicular to the face of the tablet computer.

3. The carrying case of claim 2 further comprising an ejector having one or more springs to push the second edge of the tablet computer free from the frame member when the latching mechanism is returned to the retracted position.

4. The carrying case of claim 3 wherein the retractable latching mechanism comprises:
    an actuator to be contacted by one or more fingers of a user and receive an actuation force therefrom, and to move in a first direction in response to the actuation force; and
    a first gripping member that moves in a second direction in response to movement of the actuator in the first direction such that the first gripping member moves from a first non-retracted gripper position to a first retracted gripper position to permit insertion/removal of the second edge of the tablet computer with respect to the frame member.

5. The carrying case of claim 4 wherein the retractable latching mechanism further comprises a second gripping member that moves in a direction opposite the second direction in response to movement of the actuator in the first direction such that the second gripping member moves from a second non-retracted gripper position to a second retracted gripper position to permit insertion/removal of the third edge of the tablet computer with respect to the frame member, wherein the second and third edges of the tablet computer are opposite one another and adjacent the first edge of the tablet computer.

6. The carrying case of claim 4 wherein the second direction is orthogonal to the first direction.

7. The carrying case of claim 4 wherein the second edge of the tablet computer is opposite the first edge of the tablet computer and the second direction is opposite the first direction.

8. The carrying case of claim 1 wherein the frame member comprises one or more openings to allow use of a camera built into the tablet computer.

9. The carrying case of claim 8 wherein the one or more openings in the frame member comprise an optical accessory mounting receptacle.

10. The carrying case of claim 1 wherein the frame member comprises one or more openings that form an optical path for a camera built into the tablet computer.

11. The carrying case of claim 1 wherein the frame member comprises a sound redirection structure to redirect sound from a speaker of the tablet computer towards a user when the user is facing a touch screen of the tablet computer.

12. The carrying case of claim 1 wherein the frame member comprises a sound redirection structure to redirect sound from a user towards a microphone of the tablet computer when the user is facing a touch screen of the tablet computer.

13. The carrying case of claim 1 wherein the base member comprises a mounting receptacle to receive a removable memory device that, when mounted within the mounting receptacle, can be electronically accessed by the tablet computer.

14. The carrying case of claim 13 wherein the mounting receptacle to receive a removable memory device comprises a universal serial bus port.

15. The carrying case of claim 1 further comprising a data card reader coupled to at least one of the frame member or the base member.

16. The carrying case of claim 15 where the data card reader comprises a magnetic stripe reader to read magnetic stripe cards such as credit cards.

17. The carrying case of claim 1 further comprising a radio transmitter/receiver to enable communication with devices other than the tablet computer.

18. The carrying case of claim 17 where the radio transmitter/receiver comprises circuitry to enable communications with devices other than the tablet computer using a Near Field Communications protocol.

19. A carrying case for a tablet computer, the carrying case comprising:
    means for receiving a first edge of the tablet computer as it is inserted into the carrying case and provide a foundation, immovable with respect to the carrying case, to support the weight of the tablet computer at least temporarily; and
    means for retractably latching a second edge of the tablet computer, the means for retractably latching the second edge of the tablet computer being:
        movable to a retracted position to enable the second edge of the tablet computer to be received within the carrying case, and then released to a non-retracted position to secure the second edge of the tablet computer within the carrying case, and
        returnable to the retracted position, without requiring application of force to the tablet computer, to free the second edge of the tablet computer from the carrying case.

20. The carrying case of claim 1 wherein, when released to the non-retracted position to secure the second edge of the tablet computer within the frame member, the retractable latching mechanism forms, in combination with the frame member, a recess to receive and secure the second edge of the tablet computer without requiring a notch, slot or other concavity within the second edge of the tablet computer.

* * * * *